(12) United States Patent
Koinuma

(10) Patent No.: US 7,793,214 B2
(45) Date of Patent: Sep. 7, 2010

(54) WEB PAGE AUTHORING APPARATUS, METHOD, AND PROGRAM

(75) Inventor: Masabumi Koinuma, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1316 days.

(21) Appl. No.: 11/290,778

(22) Filed: Nov. 30, 2005

(65) Prior Publication Data

US 2006/0123337 A1    Jun. 8, 2006

(30) Foreign Application Priority Data

Dec. 2, 2004    (JP)    ............................. 2004-350489

(51) Int. Cl.
*G06F 17/00* (2006.01)
*G06F 17/20* (2006.01)
*G06F 17/24* (2006.01)

(52) U.S. Cl. ..................... 715/234; 715/200; 715/203; 715/255

(58) Field of Classification Search ................. 715/200, 715/203, 234, 239, 249, 250, 255
See application file for complete search history.

(56) References Cited

U.S. PATENT DOCUMENTS

| | | | | |
|---|---|---|---|---|
| 6,558,431 B1 * | 5/2003 | Lynch et al. | ................. | 715/210 |
| 6,584,480 B1 * | 6/2003 | Ferrel et al. | ................. | 715/205 |
| 7,080,083 B2 * | 7/2006 | Kim et al. | .................... | 707/100 |
| 7,392,510 B1 * | 6/2008 | Treder et al. | ................. | 717/128 |

FOREIGN PATENT DOCUMENTS

| | | |
|---|---|---|
| JP | 06-208557 | 7/1994 |
| JP | 07-200579 | 8/1995 |

* cited by examiner

*Primary Examiner*—Laurie Ries
*Assistant Examiner*—Chau Nguyen
(74) *Attorney, Agent, or Firm*—Winstead, P.C.

(57) ABSTRACT

Provides a Web page authoring apparatus for displaying information related to batch-editing documents when an author edits a plurality of documents which are connected in a parent-child relationship. A child document of each managed document is searched based on embed-related code in the managed document to collect parent-child relationship information, and tree diagram-type inter-document information is generated and represented in a tree diagram covering all the parent-child relationships.

8 Claims, 19 Drawing Sheets

WEB PAGE AUTHORING APPARATUS, METHOD, AND PROGRAM

FIELD OF THE INVENTION

The present invention relates generally to the field of information technology, and more particularly to an apparatus, method, and program for editing and authoring Web pages with an improved view for editing.

BACKGROUND

A typical conventional Web page authoring tool has a browser-type edit screen for displaying a view object to visualize each tag content as well as a source edit screen for displaying the source of a Web page document to enable the editing of the document source code. A Web page sent from a Web server to a client browser may be constructed of or generated from several documents in an embedding relationship in which a document embeds one or more other documents according to embed-related code (e.g., jsp:include or jsp:directive.include). The conventional Web page authoring tool shows only an icon representing a child document in the browser-type edit screen even if the child document is embedded in document to be edited as a parent document according to the embed-related code. A user who creates or edits the document to be edited (hereinbelow called "author") cannot view or edit the content of the child document in the browser-type edit screen showing the parent document.

Japanese patent application laid-open No. 06-19894 (1994) discloses a document processor displaying tree diagram information on a plurality of documents connected in a parent-child relationship, which is manually created and stored separately from documents to be edited (see paragraphs 0055-0063). Then a tree diagram information is displayed so that a desired document will be called up to the screen by placing a cursor at the position of the desired document name and pressing a call key to allow the author to edit the desired document.

As mentioned above, the conventional browser-type edit screen has problems, such as that the child document is displayed as just an icon so that the author cannot find how the child document is embodied in the layout of the parent document and that the child document cannot be edited collectively in the browser-type edit screen for the parent document. In order to solve the problems, the present applicant has proposed the following Web page authoring apparatus in Japanese patent application No. 2004-350470.

The abovementioned Web page authoring apparatus includes:

means for individually managing the contents of documents forming the respective portions of a Web page to be edited, as managed documents;

means for deriving from the contents of each managed document structure information of each managed document including an embed-related code for embedding another document at a predetermined embedding position, as structure information by document;

means for assembling structure information of the Web page to be edited by combining the structure information by document based on the embed-related code in each structure information by document, as Web page structure information;

means for generating edit screen data to create an edit screen on which the tag contents of a document to be edited are converted to visual representation, based on the contents of the managed documents and the Web page structure information;

means for generating an edit screen based on the edit screen data;

means for detecting a managed document including a portion corresponding to an edited portion on the edit screen, as relevant managed document; and means for synchronizing the contents of the relevant managed document with the edited contents on the edit screen based on edit operations on the edit screen;

wherein the edit screen data generating means matches the edit screen data with the edited contents on the edit screen based on the edit operations on the edit screen.

The Web page authoring apparatus allows the author to edit a plurality of documents, connected in a direct parent-child relationship or in a chain of parent-child relationships, collectively in such a browser-type edit screen that displays them in virtually the same visual representation as on a browser screen, while viewing the content of these documents. In the browser-type edit screen, however, the author cannot find what kinds of documents are the elements of the Web page to be edited or where to edit the content in the browser-type edit screen when the author wants to edit a specified document. This makes it difficult to edit documents in a reasonable manner.

The document processor disclosed in Japanese patent application laid-open No. 06-19894 is to call up, to the screen, tree diagram information separately in a memory to allow the author to specify and edit one document at a time. In other words, the tree structure of two or more documents displayed are not for the documents in a batch editing view. Further, the tree relationship between documents in the document processor disclosed in Japanese patent application laid-open No. 06-19894 is not created based on embed-related code in each parent document. Therefore, when creating a new document, the author is required to design a parent-child relationship and enter, manually in a predetermined window, each element of a tree diagram related to the tree information one by one based on the designed parent-child relationship.

It is an object of the present invention to provide a Web page authoring apparatus, method, and program for displaying information related to batch-document to be edited in an appropriate manner when an author edits plural document to be edited connected in a parent-child relationship collectively in such a browser-type edit screen to show virtually the same content and style as on a browser screen.

SUMMARY

In one aspect of the present invention, a Web page authoring apparatus includes:

means for individually managing the contents of documents forming the respective portions of a Web page to be edited, as managed documents;

means for deriving from the contents of each managed document structure information of each managed document including an embed-related code for embedding another document at a predetermined embedding position, as structure information by document;

means for assembling structure information of the Web page to be edited by combining the structure information by document based on the embed-related code in each structure information by document, as Web page structure information;

means for generating edit screen data to create an edit screen on which the tag contents of a document to be edited are converted to visual representation, based on the contents of the managed documents and the Web page structure information;

means for generating an edit screen based on the edit screen data;

means for detecting a managed document including a portion corresponding to an edited portion on the edit screen, as relevant managed document;

means for synchronizing the contents of the relevant managed document with the edited contents on the edit screen based on edit operations on the edit screen;

means for generating inter-document information represented by a tree diagram including all parent-child relationships by searching a child document of each managed document based on the embed-related code of that managed document and collecting parent-child relationship information among the managed documents relating to the Web page to be edited, the parent-child relationship being a relationship between a parent document and a child document, the parent document being a document into which another document is embedded by an embed-related code described in the parent document, the child document being the another document;

means for generating inter-document information data for displaying the inter-document information; and means for displaying the inter-document information based on the inter-document information data;

wherein the edit screen data generating means matches the edit screen data with the edited contents on the edit screen based on the edit operations on the edit screen.

In another aspect of the present invention, a Web page authoring method includes:

individually managing the contents of documents forming the respective portions of a Web page to be edited, as managed documents;

deriving from the contents of each managed document structure information of each managed document including an embed-related code for embedding another document at a predetermined embedding position, as structure information by document;

assembling structure information of the Web page to be edited by combining the structure information by document based on the embed-related code in each structure information by document, as Web page structure information;

generating edit screen data to create an edit screen on which the tag contents of a document to be edited are converted to visual representation, based on the contents of the managed documents and the Web page structure information;

generating an edit screen based on the edit screen data;

detecting a managed document including a portion corresponding to an edited portion on the edit screen, as relevant managed document;

synchronizing the contents of the relevant managed document with the edited contents on the edit screen based on edit operations on the edit screen;

generating inter-document information represented by a tree diagram including all parent-child relationships by searching a child document of each managed document based on the embed-related code of that managed document and collecting parent-child relationship information among the managed documents relating to the Web page to be edited, the parent-child relationship being a relationship between a parent document and a child document, the parent document being a document into which another document is embedded by an embed-related code described in the parent document, the child document being the another document;

generating inter-document information data for displaying the inter-document information; and displaying the inter-document information based on the inter-document information data;

wherein the edit screen data generating step matches the edit screen data with the edited contents on the edit screen based on the edit operations on the edit screen.

In still another aspect of the present invention, there is provided a program causing a computer to function as the respective means of the above-mentioned Web page authoring apparatus. In yet another aspect of the present invention, there is provided a program causing a computer to execute the respective steps of the above-mentioned Web page authoring method. In further aspect of the present invention, there is provided a program product comprising a computer-readable recording medium recording data, and the above-mentioned program recorded on the recording medium. According to the present invention, inter-document relationship information on two or more managed documents related to a Web page to be edited is collected based on embed-related code in each managed document to display the inter-document relationship information on the managed documents in the form of a tree diagram. It allows an author to grasp what documents constitute the Web page to be edited and hence to edit the plural documents to be edited collectively in the browser-type edit screen, thus streamlining batch editing.

BRIEF DESCRIPTION OF THE DRAWINGS

The invention will be best understood by reading the following detailed description together with the drawings, wherein.

DETAILED DESCRIPTION

Figure 1:
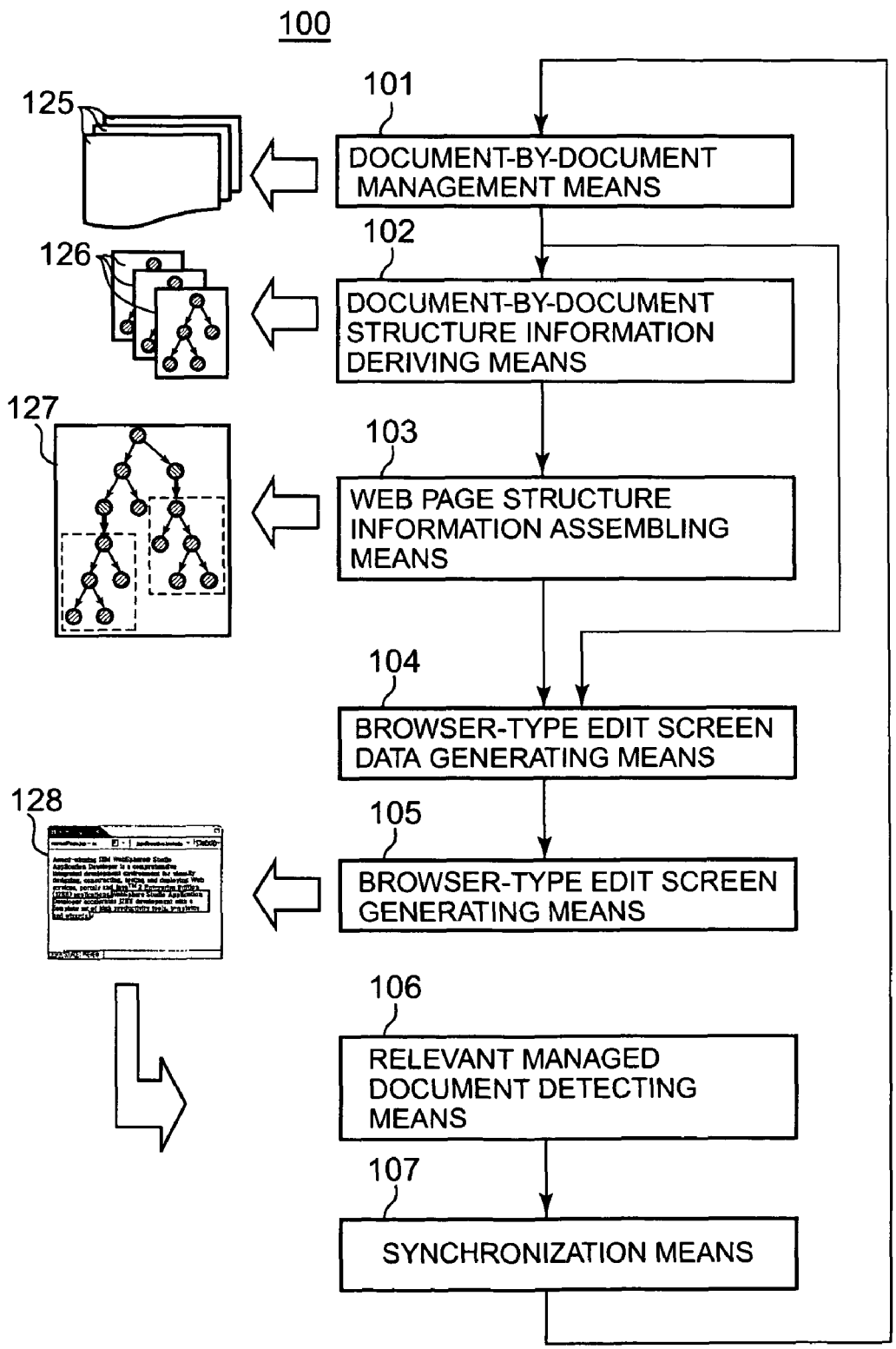
FIG. 1 is a functional block diagram of a first Web page authoring apparatus according to the present invention.

FIG. 1 is a functional block diagram of a Web page authoring apparatus 100. The Web page authoring apparatus 100 includes document-by-document means 101, document-by-document structure information deriving means 102, Web page structure information assembling means 103, browser-type edit screen data generating means 104, browser-type edit screen generating means 105, relevant managed document detecting means 106, and synchronization means 107. Here, each of documents constituting or creating a Web page is called a Web page associated document. The document-by-document management means 101 manages the contents of associated documents of the Web page to be edited individually as managed documents 125. A document to be edited specifies another document to be edited based on embed-related code contained in the document to embed it documents to be edited at a predetermined embedding location. The Web page to be edited is made up entirely of two or more managed documents 125 combined according to the embed-related code. The document-by-document structure information deriving means 102 derives, as document-by-document structure information 126, structure information on each managed document 125 from the content of each managed document 125. The Web page structure information assembling means 103 assembles, as Web page structure information 127, structure information on a Web page to be edited by combining document-by-document structure information 126 based on the embed-related code in each document-by-document structure information 126.

Here, an edit screen that transforms the tag content of documents to be edited into a visual representation without showing the tags and hence makes it easy to edit the documents to be edited in the edit screen is called a browser-type edit screen. Although typical documents to be edited are described in a markup language such as HTML or XML, the tags for the markup language, (e.g., < . . . >) are not directly displayed in the browser-type edit screen. The browser-type edit screen data generating means 104 generates browser-type edit screen data for generating a browser-type edit screen 128 based on the content of the managed documents 125 and the Web page structure information 127. The browser-type edit screen generating means 105 generates the browser-type edit screen 128 based on the browser-type edit screen data. The relevant managed document detecting means 106 detects a document including a portion corresponding to an editing portion on the browser-type edit screen 128 as a relevant managed document 125. The synchronizing means 107 synchronizes the content of the relevant managed document 125 with content edited on the browser-type edit screen 128 based on the editing operations on the browser-type edit screen 128. The browser-type edit screen data generating means 104 matches the browser-type edit screen data with the content edited on the browser-type edit screen 128 based on the editing operations on the browser-type edit screen 128.

Figure 3:
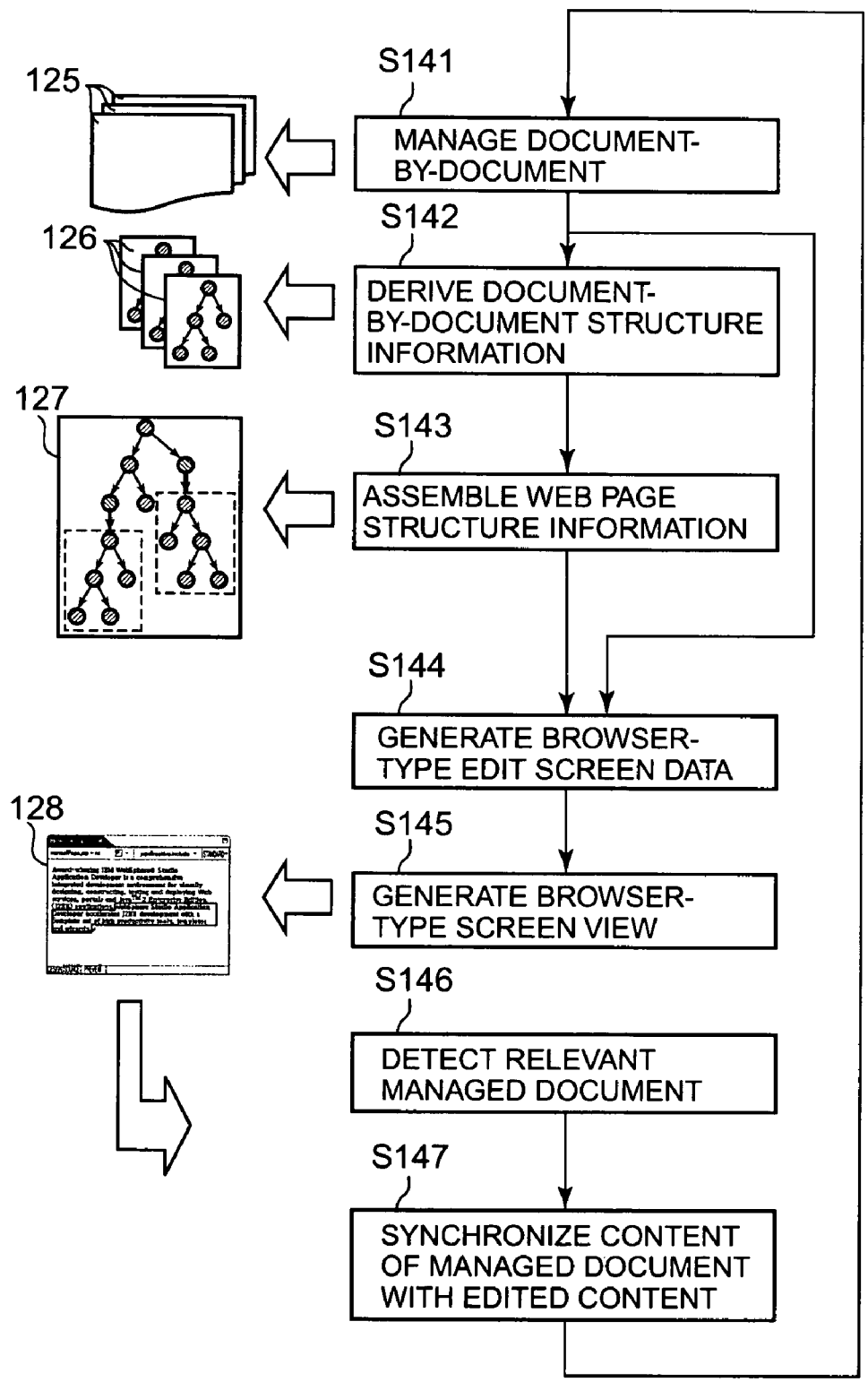
FIG. 3 is a flowchart of a first Web page authoring method according to the present invention.

FIG. 3 is a flowchart of a Web page authoring method 140. In document-by-document management step S141, documents associated with Web page to be edited are managed as managed documents 125 individually. In document-by-document structure information deriving step S142, structure information on each managed document 125 is derived as document-by-document structure information 126 from the content of the managed document 125. In Web page structure information assembling step S143, structure information on a Web page to be edited is assembled as Web page structure information by combining document-by-document structure information 126 based on embed-related code in each document-by-document structure information 126. In browser-type edit screen data generating step S144, browser-type edit screen data for generating a browser-type edit screen 128 is generated based on the content of the managed documents 125 and the Web page structure information. In browser-type edit screen generating step S145, the browser-type edit screen 128 is generated based on the browser-type edit screen data. In step S146 for detecting a relevant managed document 125, a managed document including a portion corresponding to an editing portion in the browser-type edit screen 128 is detected as a relevant managed document 125. In synchronizing step S1147, the content of the relevant managed document 125 is synchronized with content edited on the browser-type edit screen 128 based on the editing operations on the browser-type edit screen 128. Then, in browser-type edit screen data creating step S144, the browser-type edit screen data is matched with the content edited on the browser-type edit screen 128 based on the editing operations on the browser-type edit screen 128.

Since the Web page authoring apparatus 100 of FIG. 1 and the Web page authoring method 140 of FIG. 3 have the same technical effect, except that one is implemented as an apparatus invention and the other a method invention, and they are different only in invention category. Thus the following collectively describes both.

For example, a Web page is a structured document, while each of Web page associated documents is a structured document or a document to be structured for generating a structured document. To be more specific, a Web page to be edited is, for example, an HTML document, while a managed document 125 is, for example, a JSP, HTML, or XML document. Assuming that there are two documents in an embedding relationship in which embed-related code is in one document to embed the other document, the one is called a parent document and the other is called a child document. Unlike those supporting the editing of only the parent document, the Web page authoring apparatus 100 supports the editing of both the parent document and the child document.

In typical Web systems, Web pages are HTML documents. When two or more documents to be edited are predetermined Web page associated documents, the document at the top of the hierarchy of those document to be edited is, for example, a JSP document. The child document is a JSP, HTML, or XML document. In case of JSP documents, Java™ code is embedded in HTML in an appropriate manner. Therefore, if the child document is a JSP document, other documents can be embedded in the child document using embed-related code. Thus, any two managed documents extracted from documents associated with a common Web page to be edited may be in a direct parent-child relationship, or in such a relationship that they are located at both ends of a chain of parent-child relationships (that is, in a relationship between ancestor and descendant more than two generations apart).

There are the following cases: (a) a child document may be embedded in two or more portions of a parent document; or (b) since the Web page authoring apparatus 100 and the Web page authoring method 140 enable the editing of two or more Web pages by switching over among them, a document as a child document may be included in parent documents for different Web pages. In the Web page authoring apparatus 100 and the Web page authoring method 140, the document-by-document management means 101 manages a child document in an integrated fashion as one managed document 125. Therefore, if the child document in the case (a) is edited in one of the inclusion portions of one parent document, the same editing operation can be done automatically in the other portions, thereby omitting the successive editing of the other portions. On the other hand, if the child document in the case (b) is edited on the browser-type edit screen 128 related to one parent document, the editing of the child document in the other parent documents can be omitted.

Figure 9:
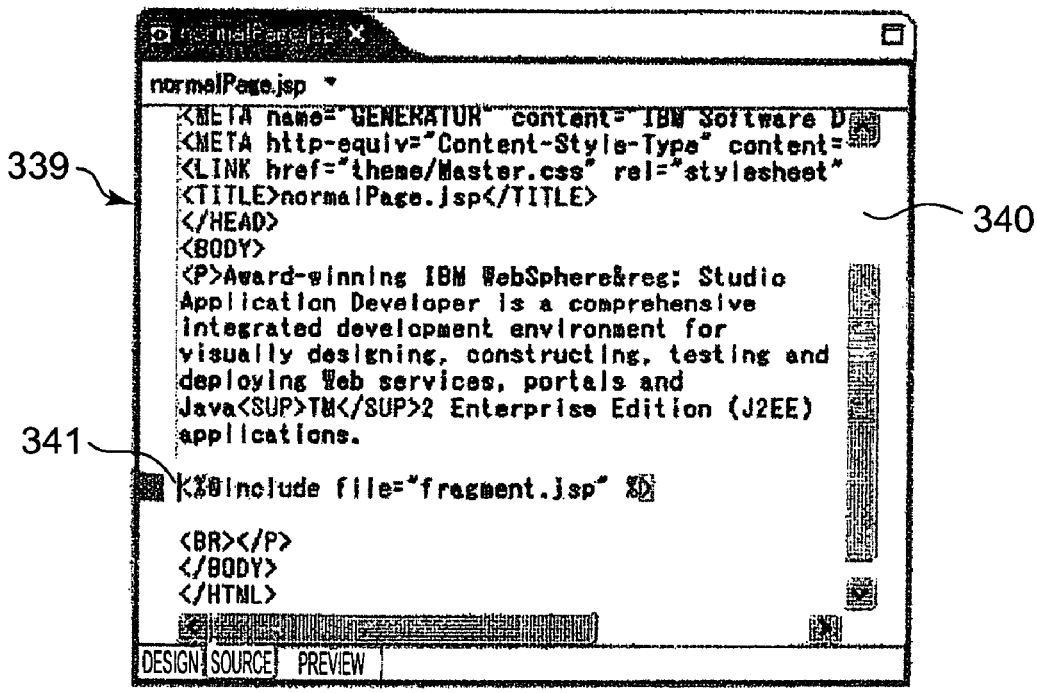
FIG. 9 shows a display state of a parent document on a source screen of a Web page authoring tool.
Figure 10:
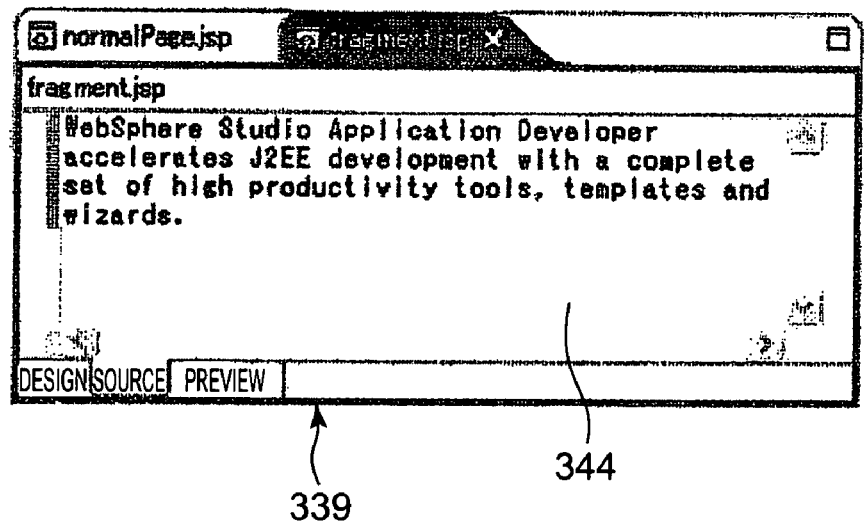
FIG. 10 shows a display state of the child document on the source screen of the Web page authoring tool.

FIGS. 9 and 10 show the display states of a parent document 340 and a child document 344 on a source screen 339 of a Web page authoring tool 338, respectively. The Web page authoring tool 338 is an example of the Web page authoring apparatus 100. The parent document 340 and the child document 344 are examples of predetermined documents associated with Web page to be edited. The Web page authoring tool 338 can display the documents to be edited in the source screen 339, a design screen 347 (FIG. 11), and a preview screen, respectively. The design screen 347 is an example of the browser-type edit screen 128.

The source screen 339 displays the source code of documents to be edited, showing the parent document 340 with not only its tag content but also a tag element(s) to indicate the inclusion of the child document 344. Both the parent document 340 and the child document 344 are JSP documents, and the name of the parent document 340 is normalPage.jsp. The name of the child document 344 is fragment.jsp as apparent from the following embed-related code 341: <%@Include file="fragment.jsp"%>. In this specification, the documents are defined as all files but executable ones. Although the embed-related code 341 states that the child document 344 is included in the node position defined in the embed-related code 341, it should be noted that the present invention is applicable to such a case that the embed-related code may be rewritten in future to specify another node position.

The Web page authoring tool 338 starts a browser on the preview screen so that the browser will render the actual state of the document to be edited. The preview screen of the Web page authoring tool 338 is the same as that of the browser. An individual document is displayed on the source screen 339, while a Web page to be edited generated by combining documents based on the embed-related code is displayed on the design and preview screens.

The source screen 339 in FIG. 9 shows only the final paragraph of the parent document 340 due to limitations of screen space without showing the beginning part of the parent document 340 in the source screen 339. The author can drag the scroll box to any position in the scroll bar on the right hand to edit any part of the parent document 340. The embed-related code 341 is placed in (BODY) section between start tag <BODY> and end tag </Body> in the parent document 340.

Figure 11:
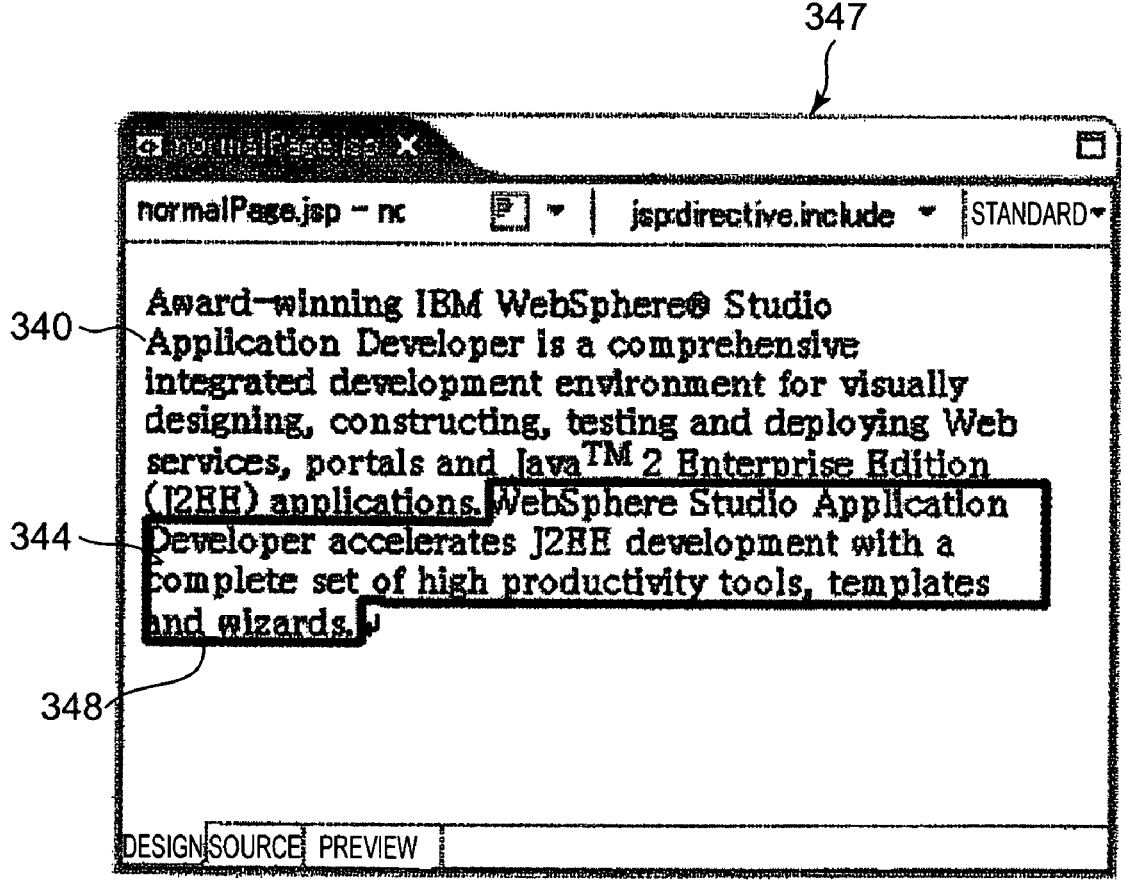
FIG. 11 shows a display state of the parent document and a child in a design screen of the Web page authoring tool.

FIG. 11 shows the display state of the parent document 340 on the design screen 347 of the Web page authoring tool 338. The design screen 347 is an example of the browser-type edit screen 128 (FIGS. 1 and 3). An inclusion box 348 is just added to FIG. 11 to clearly illustrate the position of including the child document 344 on the design screen 347; it does not appear in an actual design screen 347. However, the inclusion box 348 may be actually displayed with a predetermined operation to let the author know where the child document 344 is located at the time of editing. The Web page authoring tool 338 shows a Web page to be edited as if it looks visually the same on both the design screen 347 and the preview screen. A different point is that when clicking on a link-embedded text part or image on the preview screen, the Web page is switched to a Web page as its link destination, whereas such a thing never happens on the design screen 347. The author can directly edit the source code of the parent document 340 and the child document 344 on the source screen 339 (FIGS. 9 and 10) while the author can edit the parent document 340 and the child document 344 on the design screen 347 in the same display state as that of the browser screen for the document to be edited in which the parent document 340 and the child document 344 are associated documents, that is, even if the author is not familiar with specific HTML tag content or JSP commands.

Figure 12:
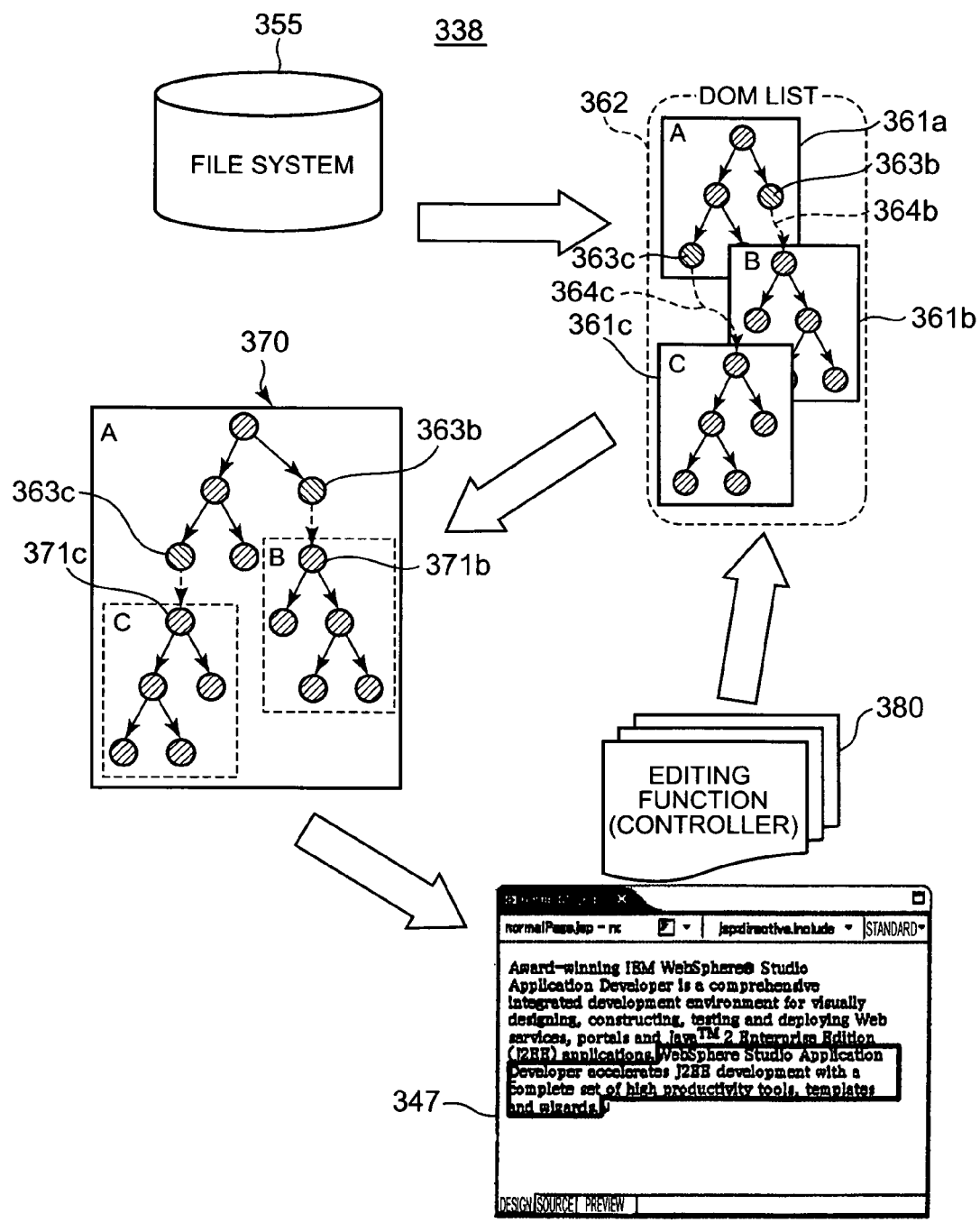
FIG. 12 is an illustration for explaining processing functions of the Web page authoring tool.

FIG. 12 is an illustration for explaining processing functions of the Web page authoring tool 338. It is assumed in FIG. 12 that the Web page to be edited is represented as Web page W (though W is not shown, W is used to indicate a specific Web page for convenience of explanation), and documents A, B, and C are documents associated with the Web page W. It is further assumed that the document A is a parent document, and the documents B and C are child documents embedded in different portions of the document A. Here, suppose that the documents A, B, and C are already stored in a file system 355. In other words, this editing session is to reedit the Web page W. The file system 355 is an example of an auxiliary memory 224, typified by a local drive of a personal computer on which the Web page authoring tool 338 is installed. When the author specifies the document A or the Web page W, the Web page authoring tool 338 loads the document A from the file system 355. The Web page authoring tool 338 searches the loaded document A for embed-related code, and if any embed-related code is found, the documents B and C are loaded from the file system 355 as documents to be embedded in the document A. If either or both of the documents B and C further have child documents, they will be processed in the same manner as the document A. Searching the document A for embed-related code may be done in connection with the creation of DOM information 361a on the document A.

The Web page authoring tool 338 creates DOM information 361a, 361b and 361c on each document loaded, and manages these pieces of DOM information in a DOM list 362. The DOM (Document Object Model) itself is well-known XML structure information. The DOM list 362 also manages embed-related nodes 363b and 363c associated with the embed-related code in the parent document and link information 364b and 364c to the child documents embedded in the parent document by the embed-related code. The management of the content of each of the documents A, B, and C in the DOM list 362 corresponds to the management of managed documents by the document-by-document management means 101 of the Web page authoring apparatus 100 and in step S141 of the Web page authoring method 140. The derivation of the DOM information 361a, 361b, and 361c corresponds to the derivation of the document structure information 126 by the document structure information deriving means 102 of the Web page authoring apparatus 100, and in step S142 of the Web page authoring method 140. The embed-related nodes 363b and 363c, and the link information 364b and 364c are examples of information as the basis of processing for assembling the Web page structure information 127 by the Web page structure information assembling means 103 of the Web page authoring apparatus 100 and in step S1143 of the Web page authoring method 140.

A view object tree 370 corresponds to the DOM information on the entire Web page W; it is created based on the DOM information 361a, 361b and 361c, the embed-related nodes 363, and the link information 364. In the view object tree 370, the embed-related nodes 363b and 363c of the document A as the parent document are managed integrally with the root nodes 371b and 371c of the documents B and C as the child documents linked to the parent document, respectively. The view object tree 370 is an example of the Web page structure information 127.

Since each node in the view object tree 370 also contains the content of the documents A, B, or C, the edit screen data from which the design screen 347 is generated is generated based on the view object tree 370. The design screen 347 is generated based on the edit screen data. The design screen 347 in FIG. 12 has the same content as the design screen 347 in FIG. 11. However, an actual display of the design screen 347 of FIG. 12 shows view objects, such as text and images, defined in each of the documents A, B, and C to be displayed on the Web page, in virtually the same visual representation as on a browser screen, that is, in a visual representation mode of the browser-type edit screen.

The author edits the Web page W on the design screen 347. The editing on the design screen 347 includes the editing of text and style (layout, font, font size, etc.), and editing associated with the inclusion of other documents. The editing may also include the editing of images as well as that of text. The Web page authoring tool 338 having sufficient editing functions allows the author to edit image content itself on the design screen 347 as well as to do some simple editing of an image such as to insert and delete the image. In addition, the author can do editing work on the design screen 347 without consideration about to which of the documents A, B, and C the portion being edited belongs.

An editing function part 380 monitors the editing done by the author on the design screen 347. Processing in the editing function part 380 corresponds to specific procedures in the managed document detecting means 106 and the synchronization means 107 of the Web page authoring apparatus 100 and in steps S146 and S147 of the Web page authoring method 140. Based on the monitoring results, the editing function part 380 detects which of the documents A, B, and C includes the portion corresponding to the portion edited on the design screen 347. Then, once the content is updated on the design screen 347, the updated content is reflected in the content of the corresponding document A, B, or C. When editing corresponding to the addition or deletion of a node is done on the design screen 347, the addition or deletion of the node is performed on the DOM information 361a, 361b, or 361c. When an inclusion position is changed on the design screen 347, a corresponding include node 363b or 363c, and corresponding link information 364b or 364c, etc. in the DOM list 362 are changed in synchronization with the change on the design screen 347. When editing corresponding to the inclusion of a new child document or deletion of an existing child document is done on the design screen 347, the addition of new DOM information to the DOM list 362 or the deletion of a corresponding piece of link information from the DOM list 362 is performed in synchronization with the editing operation on the design screen 347.

The view object tree 370 is updated as the DOM information 361a, 361b, or 361c is updated in the DOM list 362. Thus the consistency between the content of the design screen 347 and that of the view object tree 370 is maintained. To be more specific, this matching process includes the following steps. In the first step (a), the author does editing work on the design screen 347. In step (a), the edited content is not reflected on the design screen 347 yet. In the next step (b), a corresponding piece of DOM information 361a, 361b, or 361c is updated. As a result, a difference occurs between the content of the DOM information 361a, 361b, or 361c and the content of the design screen 347. In step (c), the view object tree 370 is updated based on the updated content of the DOM information 361a, 361b, or 361c. Steps (a) to (c) are completed instantaneously, so that the author will feel like the design screen 347 is reflecting the content the author has just input or edited.

As stated above, when the plural documents A, B, and C in a parent-child relationship are associated documents for one Web page W, the Web page authoring tool 338 generates a design screen 347 in virtually the same representation mode as that of a browser showing the Web page W, so that the author can edit the documents A, B, and C collectively on the design screen 347.

Returning to FIGS. 1 and 3, additional functions and additional processing of the Web page authoring apparatus 100 and the Web page authoring method 140 will be described below.

In order to match the browser-type edit screen data to the content edited on the browser-type edit screen, the browser-type edit screen data generating means 104 of the Web page authoring apparatus 100 updates the browser-type edit screen data based on the synchronization between the content of the managed document 125 and that of the Web page structure information 127. Similarly, in order to match the browser-type edit screen data with the content edited in the browser-type edit screen, the browser-type edit screen data is updated in step S1144 of the Web page authoring method 140 based on the synchronization between the content of the managed document 125 and that of the Web page structure information 127.

The following describes a typical example of the process to reflect the content edited by the author on the browser-type edit screen:

(a) The content of editing done by the author in the browser-type edit screen 128 is reflected on the content of a corresponding managed document 125. At this moment, the browser-type edit screen 128 is not changed yet.

(b) The Web page-structure information 127 is updated based on the updated content of the managed document 125.

(c) The browser-type edit screen data is updated to update the browser-type edit screen 128.

Figure 2:
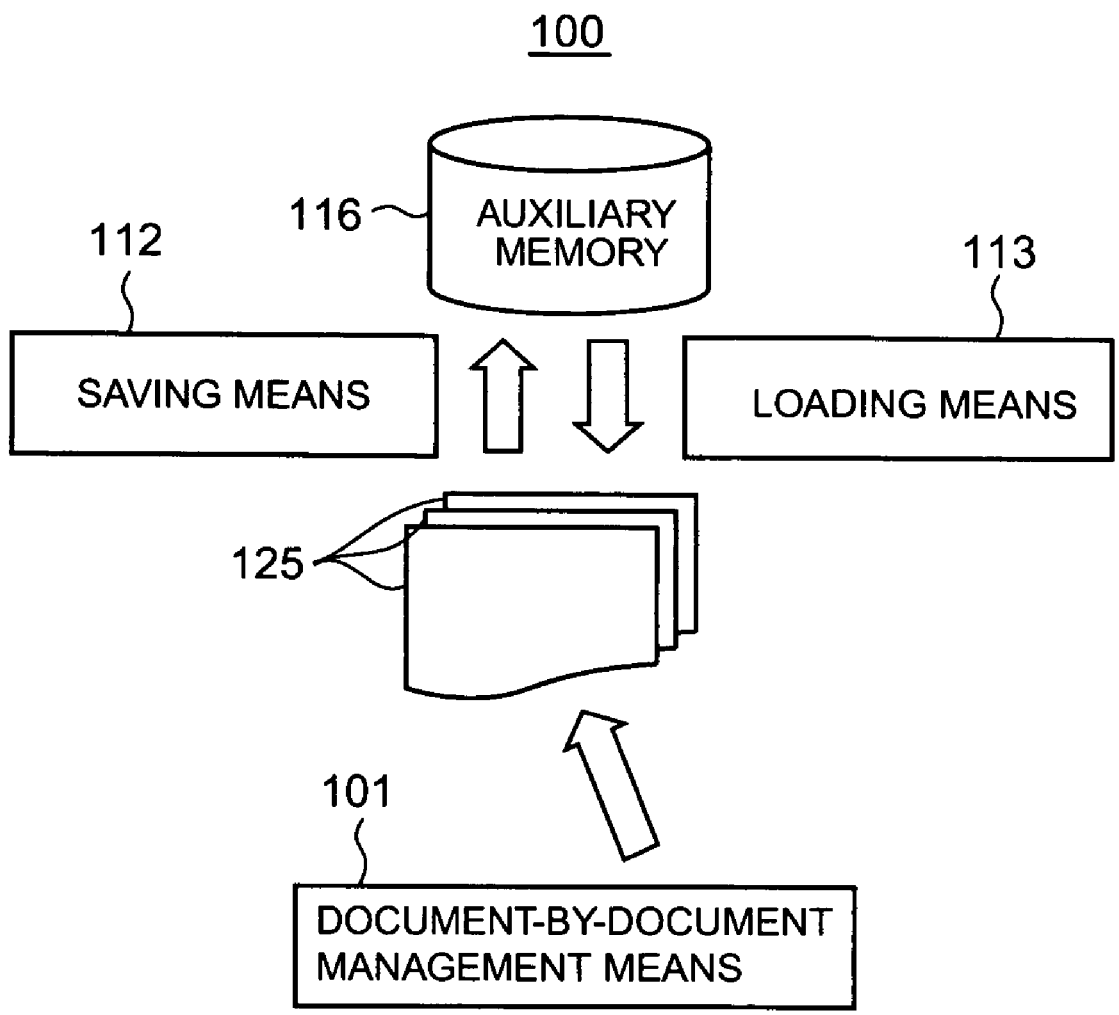
FIG. 2 is a functional block diagram of the main part of the first Web page authoring apparatus with additional functions.
Figure 4:
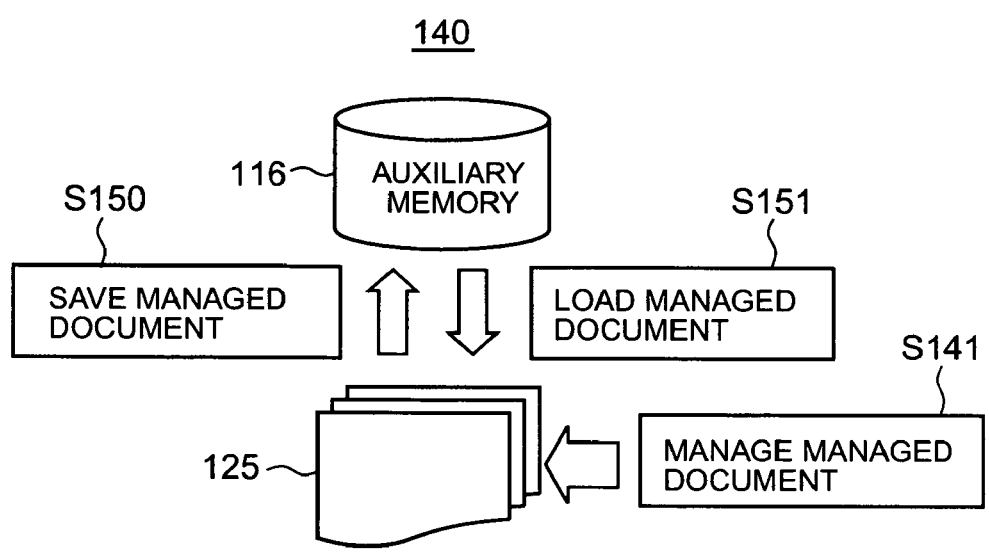
FIG. 4 is a flowchart of the main part of the first Web page authoring method with additional processing steps.

FIG. 2 is a functional block diagram of the main part of the Web page authoring apparatus 100, showing additional functions. FIG. 4 is a flowchart of the main part of the Web page authoring method 140, showing additional processing steps. When saving a Web page to be edited into an auxiliary memory 116, saving means 112 of the Web page authoring apparatus 100 saves at least a corresponding managed document 125 the content of which is updated (typically all the managed documents 125). When loading a Web page to be edited from the auxiliary memory 116 prior to start of editing, loading means 113 loads all the documents associated with the Web page to be edited. The document-by-document management means 101 manages the content of the loaded associated documents individually as managed documents 125. Similarly, when a Web page to be edited is saved into the auxiliary memory 116, at least a corresponding managed document 125 the content of which is updated (typically all the managed documents 125) is saved in saving step S1150 of the Web page authoring method 140. On the other hand, when a Web page to be edited is loaded from the auxiliary memory 116 prior to start of editing, all the documents associated with the Web page to be edited are loaded in loading step S151. Then, in step S141, the content of the loaded associated documents are managed individually as managed documents 125. As stated above, the Web page associated documents edited in the browser-type edit screen 128 are saved in the auxiliary memory 116, and upon reediting, they are loaded from the auxiliary memory 116 into the Web page authoring apparatus 100. The saving and loading operations are thus performed without difficulty.

Here, a hierarchical relation between documents is so defined that the level of a document to embed another document is at one or more level higher than that of another document. Among the Web page-associated managed documents 125, the one at the top of the hierarchy is called the top managed document 125. The loading means 113 of the Web page authoring apparatus 100 first loads the top managed document 125 among the Web page associated managed documents 125 to be reedited. Then, when the loaded managed document 125 is to include such a managed document 125 that is at the next lower level, the loading means 113 loads the next-lower-level managed document 125 from the auxiliary memory 116. Similarly, in step S151 of the Web page authoring method 140, the top managed document 125 is first loaded among the Web page-associated managed documents 125 to be reedited. Then, when the loaded managed document 125 is to include such a managed document 125 that is at the next lower level, the next-lower-level managed document 125 is loaded in step S151 from the auxiliary memory 116. As stated above, when a Web page to be edited already stored in the auxiliary memory 116 is to be reedited, associated documents can be loaded from the auxiliary memory 116 without difficulty.

In FIG. 1, when such an editing operation as to add a new document to be edited is performed on the browser-type edit screen 128, the synchronization means 107 synchronizes the addition of a corresponding managed document 125 with the addition of the new document to be edited to the browser-type edit screen 128, thus adding the managed document 125. Similarly, in FIG. 3, when such an editing operation as to add a new document to be edited is performed in the browser-type edit screen 128, the addition of a corresponding managed document 125 is synchronized in step S147 with the addition of the new document to be edited to the browser-type edit screen 128, thus adding the managed document 125. When a new Web page to be edited is created, a new parent document needs to be added, while when a new child document to be included in the parent document is created, the new child document needs to be added. A new managed document 125 is added each time a document is added to the browser-type edit screen 128. This allows for the addition of a new document to be edited through the editing operation on the browser-type edit screen 128.

Further, when such an editing operation as to delete a document to be edited is performed on the browser-type edit screen 128, the synchronization means 107 synchronizes the deletion of a corresponding managed document 125 with the deletion of the document to be edited from the browser-type edit screen 128, thus deleting the managed document 125. Similarly, in step S147, when such an editing operation as to delete a document to be edited is performed on the browser-type edit screen 128, the deletion of a corresponding managed document 125 is synchronized with the deletion of the document to be edited from the browser-type edit screen 128, thus deleting the managed document 125. This allows for the deletion of a document to be edited through the editing operation in the browser-type edit screen 128.

Note that such an editing operation as to cancel the inclusion of a document to be edited as a child document may also be performed on the browser-type edit screen 128. Under such circumstances, it should be considered two different cases: (a) when the child document is included in two or more portions, and (b) when the child document is included in only one portion. In case (a), the Web page authoring apparatus 100 and the Web page authoring method 140 typically synchronizes the cancellation of inclusion of a corresponding managed document 125 with the cancellation of inclusion of the document to be edited on the browser-type edit screen 128 to delete only the link information 364b or 364c (FIG. 12). In case (b), the synchronization means 107 synchronizes the cancellation of inclusion of the corresponding managed document 125 with the deletion of inclusion of the document to be edited on the browser-type edit screen 128 to delete the managed document 125.

The document-by-document structure information 126 is tree structure information, while the Web page structure information 127 is tree structure information connecting all pieces of tree structure information on the managed documents 125 in such a management relationship that a node associated with embed-related code in tree structure information on a certain managed document 125 is attached to the root of another managed document 125 to be embedded in the certain managed document 125 according to the embed-related code. The pieces of DOM information 361a, 361b, and 361c in FIG. 12 are examples of the document-by-document structure information 126 as the tree structure information, while the view object tree 370 in FIG. 12 is an example of the Web page structure information 127 as the tree structure information.

Figure 5:
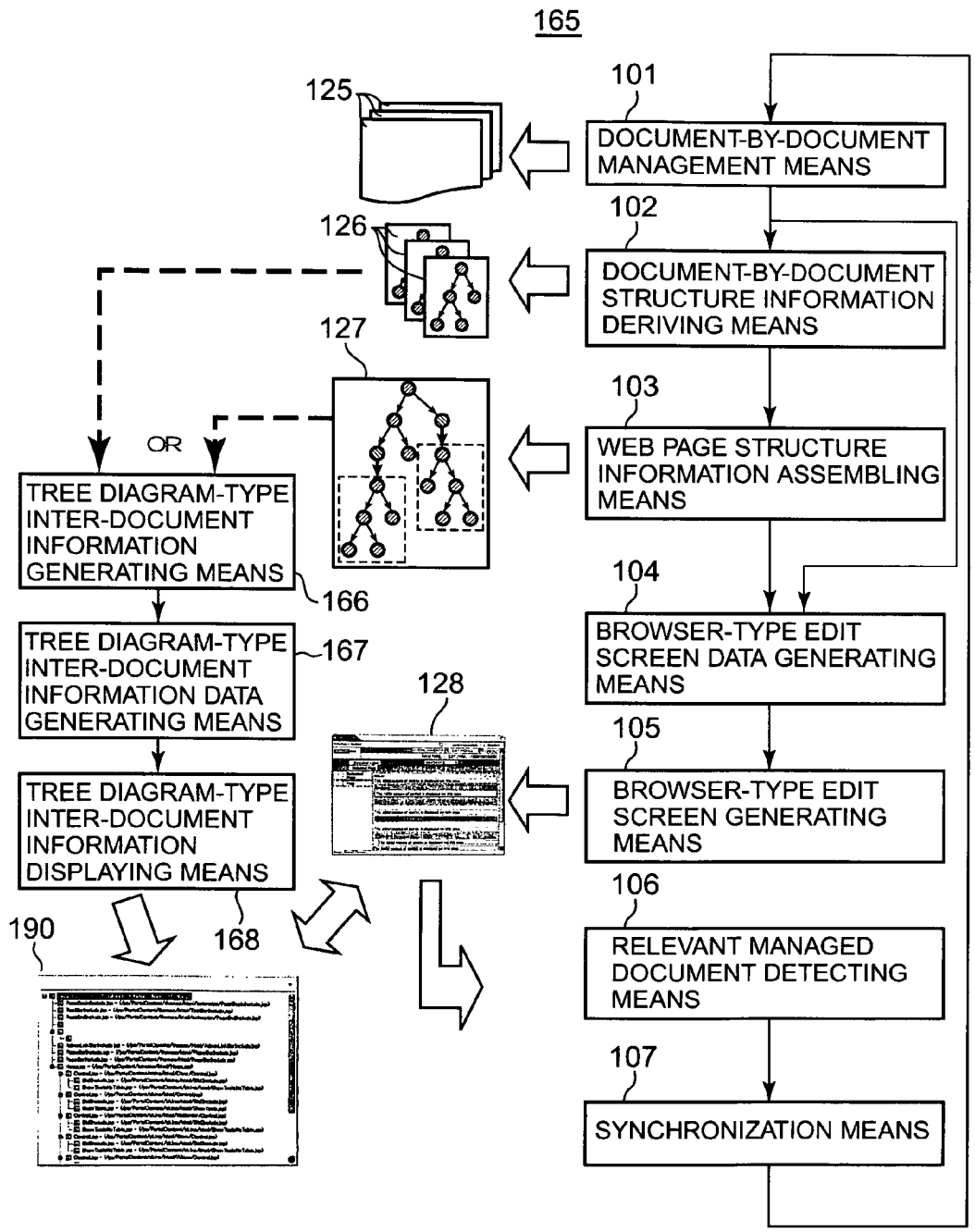
FIG. 5 is a functional block diagram of a second Web page authoring apparatus, which adds a tree diagram-type inter-document information presenting function to the first Web page authoring apparatus.

FIG. 5 is a functional block diagram of a Web page authoring apparatus 165. Components common to those in the Web page authoring apparatus 100 (FIGS. 1 and 2) are indicated by the same reference numerals, and the following describes mostly different points. The Web page authoring apparatus 165 of FIG. 5 adds tree diagram-type inter-document information generating means 166, tree diagram-type inter-document information data generating means 167, and tree diagram-type inter-document information displaying means 168 to the Web page authoring apparatus 100.

Among two documents, one document embedding the other document according to embed-related code is called a "parent document," while the other document embedded is called a "child document." Further, the relationship between the parent document and the child document is called a parent-child relationship. The tree diagram-type inter-document information generating means 166 searches for a child document of each managed document 125 based on embed-related code in the managed document 125 to collect parent-child relationship information on documents associated with Web page to be edited so as to generate tree diagram-type inter-document information 190 represented in a tree diagram covering all the parent-child relationships based on the collected parent-child relationship information. The tree diagram-type inter-document information data generating means 167 generates tree diagram-type inter-document information data for displaying the tree diagram-type inter-document information 190. The tree diagram-type inter-document information displaying means 168 displays the tree diagram-type inter-document information 190 based on the tree diagram-type inter-document information data.

Figure 7:
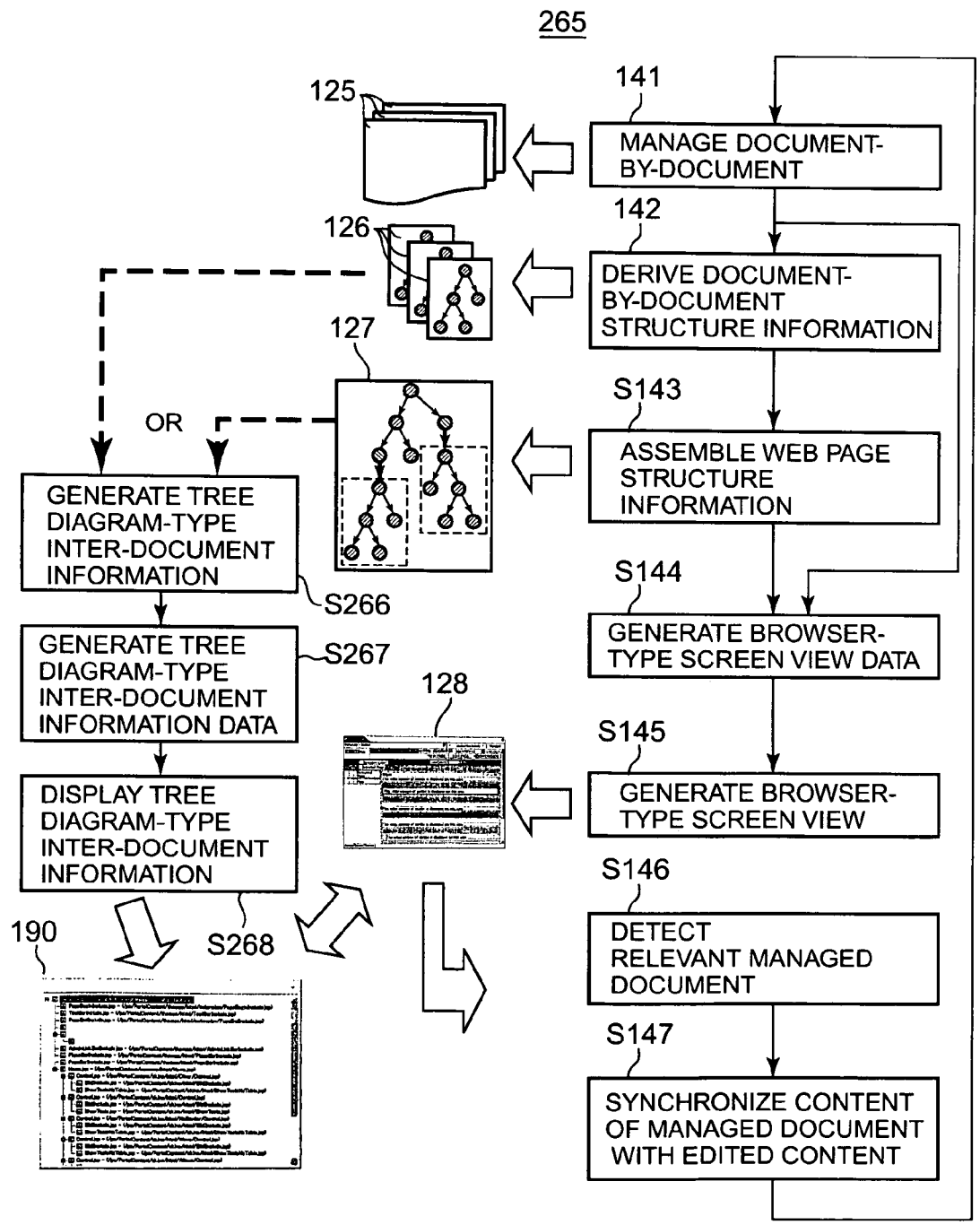
FIG. 7 is a flowchart of a second Web page authoring method, which adds tree diagram-type inter-document information presenting processing to the first Web page authoring method.

FIG. 7 is a flowchart of a Web page authoring method 265. The Web page authoring method 265 differs from the above-mentioned Web page authoring method 140 in that it adds steps S266, S267, and S268 to the Web page authoring method 140. In inter-document tree diagram information generating step S266, a child document of each managed document 125 is searched for based on embed-related code in the managed document 125 to collect parent-child relationship information on documents associated with Web page to be edited so as to generate tree diagram-type inter-document information 190 represented in a tree diagram covering all the parent-child relationships based on the collected parent-child relationship information. In tree diagram-type inter-document information data generating step S267, tree diagram-type inter-document information data is created to display the tree diagram-type inter-document information 190. In tree diagram-type inter-document information displaying step S268, the tree diagram-type inter-document information 190 is displayed based on the tree diagram-type inter-document information data.

Since the Web page authoring apparatus 165 of FIG. 5 and the Web page authoring method 265 of FIG. 7 have the same technical effect, except that one is implemented as an apparatus invention and the other a method invention, and they are different only in invention category. Thus the following collectively describes both.

A child document is searched for by tree diagram-type inter-document information generating means 166 and in step S266 based on the embed-related code in the managed document 125. However, the search process is not limited to one directly based on the managed document 125. It is essential only that the search process is based on the managed document 125 irrespective of whether it is based on the managed document 125 directly or indirectly. For example, since the document-by-document structure information 126 and Web page structure information 127 are created based on the managed document 125, a child document can be searched for based on embed-related code information on the document-by-document structure information 126 and/or the Web page structure information 127.

Although the tree diagram-type inter-document information 190 is typically displayed in a different window (e.g., window 654 in FIG. 14) from the browser-type edit screen 128, it may be displayed in a predetermined area in the browser-type edit screen 128. When the tree diagram-type inter-document information 190 is displayed in one window, the window may remain displayed during the editing of the a page to be edited, or tree diagram-type inter-document information 190 may be created each time the author makes a request so that its window will be displayed together with the browser-type edit screen 128. As will be described later, information other than inter-document relationship information, such as embed-related code information on each document, information on whether each document is to be edited or not, and absolute path information, may be added to the tree diagram-type inter-document information 190.

Figure 13:
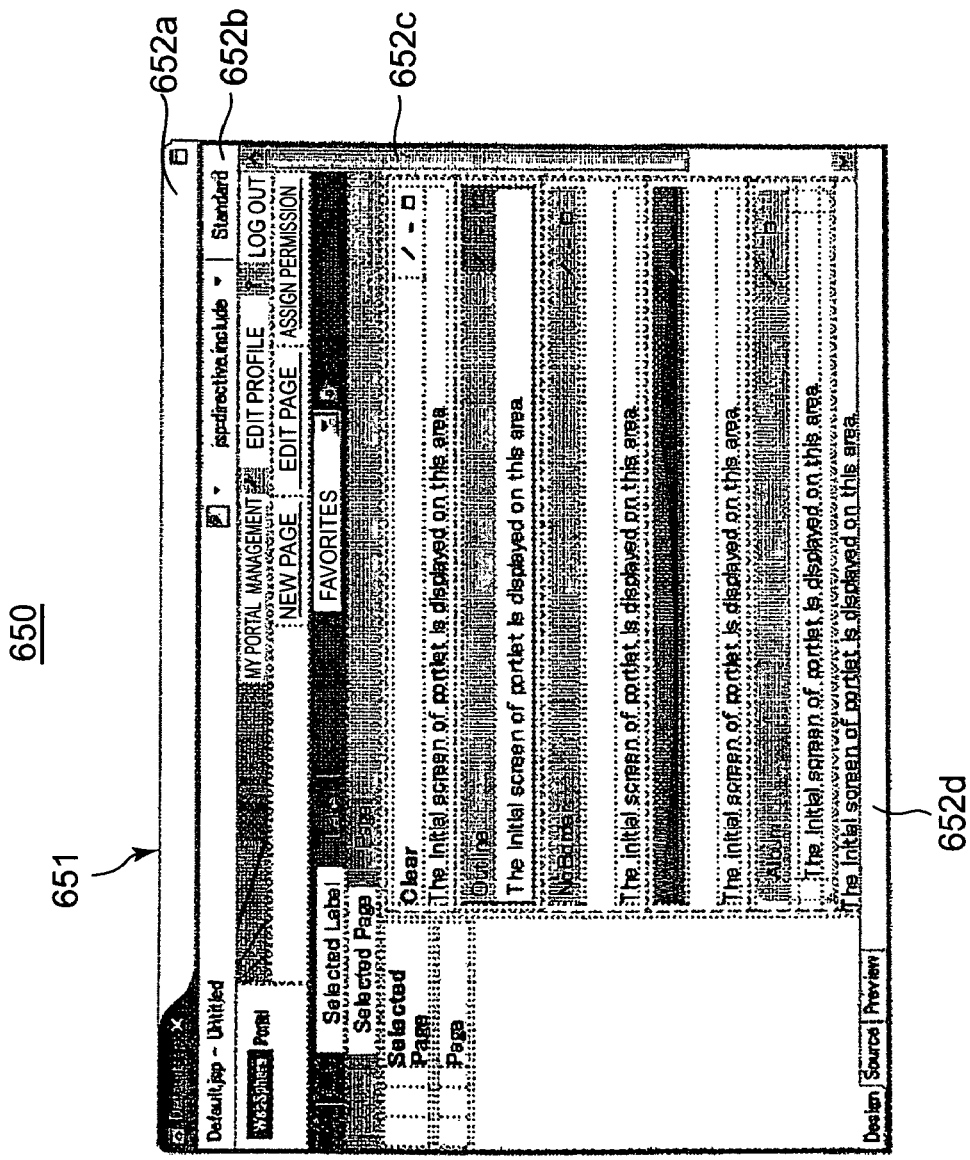
FIG. 13 shows a browser-type edit screen of another Web page authoring tool.

FIG. 13 shows a browser-type edit screen 651 of a Web page authoring tool 650. The Web page authoring tool 650 is an example of the Web page authoring apparatus 165, and the browser-type edit screen 651 is an example of the browser-type edit screen 128. Although the black-and-white drawing makes it hard to understand the structure, the first line 652a (a line with "DefaultjspX" at the left end), the second line 652b (a line with "Defaultjsp-Untitled" at the left end), scroll bar 652c on the right side, and line 652d at the bottom (with "DesignSourcePreview" at the left end) are areas for displaying items other than the document content, and all other areas are editing areas for displaying the document content. In the browser-type edit screen 651, rectangular areas, each of which includes Clear, Outline, NoBorder, Wave, or Album in the first line, correspond to respective managed documents 125.

Figure 14:
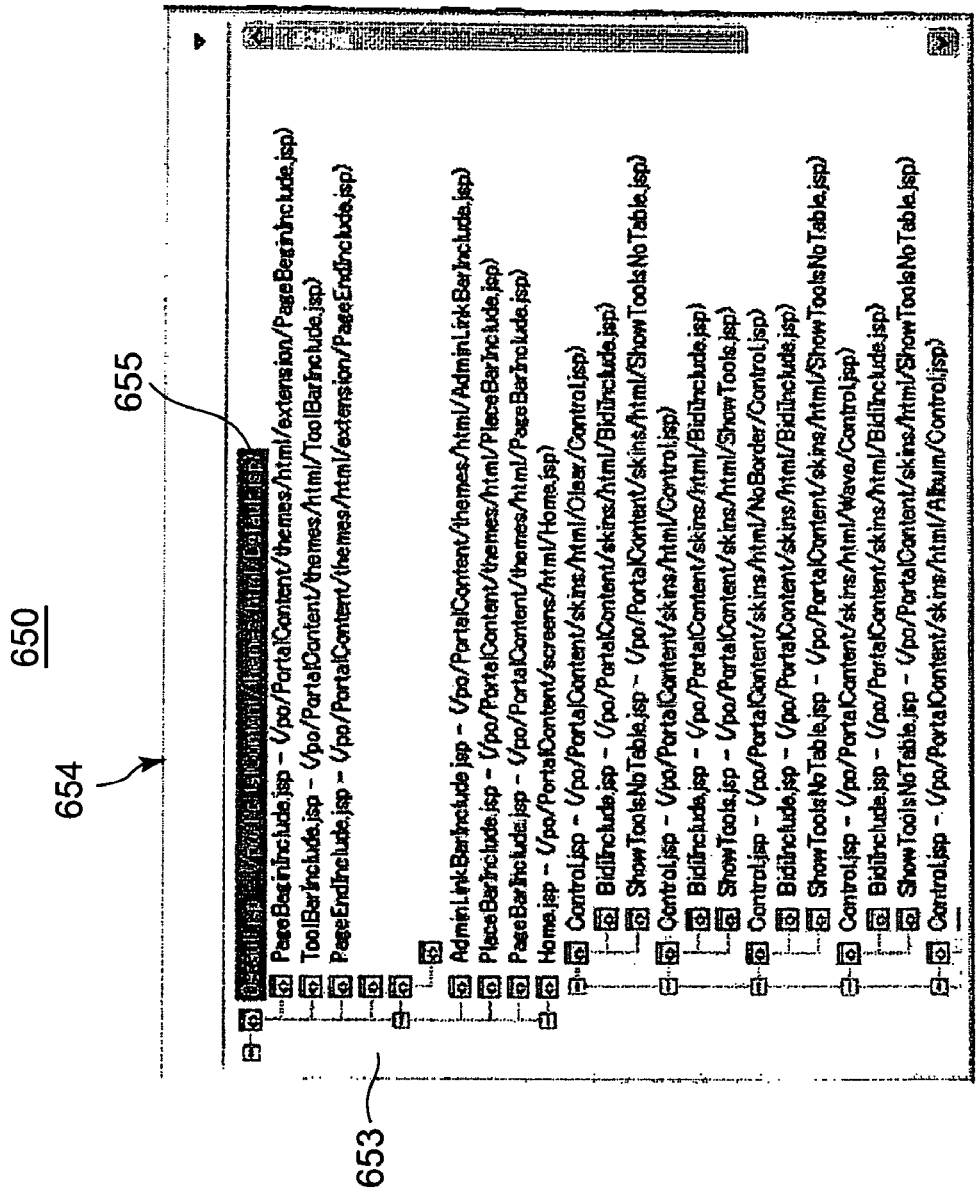
FIG. 14 shows a window showing tree diagram-type inter-document information in the Web page authoring tool.

FIG. 14 shows the window 654 displaying tree diagram-type inter-document information 653 in the Web page authoring tool 650. The tree diagram-type inter-document information 653 is an example of the tree diagram-type inter-document information 190. The tree diagram of the tree diagram-type inter-document information 653 in the window 654 is just an illustrative example of a way of displaying a tree structure. It is apparent from FIG. 14 that the top managed document 125 is a Default.jsp document (whose absolute path is /po/PortalContent/themes/html/Default.jsp). Following the top managed document 125 are, for example, a Home.jsp document (whose absolute path is /po/PortalContent/screens/html/Home.jsp) as a child document of Default.jsp, and plural Control.jsp documents as child documents of Home.jsp. The absolute paths of Control.jsp are /po/PortalContent/skins/html/Clear/Control.jsp, /po/PortalContent/skins/html/Control.jsp, /po/PortalContent/skins/html/NoBorder/Control.jsp ..., respectively.

The window 654 shows the tree diagram-type inter-document information 653 in such a manner that each document is followed by its absolute path. Although there is a conventional Web page authoring tool that can represent structure information on one document as a tree diagram, elements shown in the tree diagram are just tag elements. In this case, tags related to embed-related code (such as jsp.include) are shown as tag elements, but no name of a document included is shown. In the tree diagram, however, if the author right-clicks on any element related to embed-related code, the relative path (document name only) of a child document included with the position of corresponding embed-related code as reference is shown. Unlike the conventional Web page authoring tool, the Web page authoring tool 650 displays each absolute path in the window 654, making it easy to distinguish among documents even if they have the same document name. Note in FIG. 14 that 655 indicates a focused state. The focused state 655 will be described later.

Figure 6:
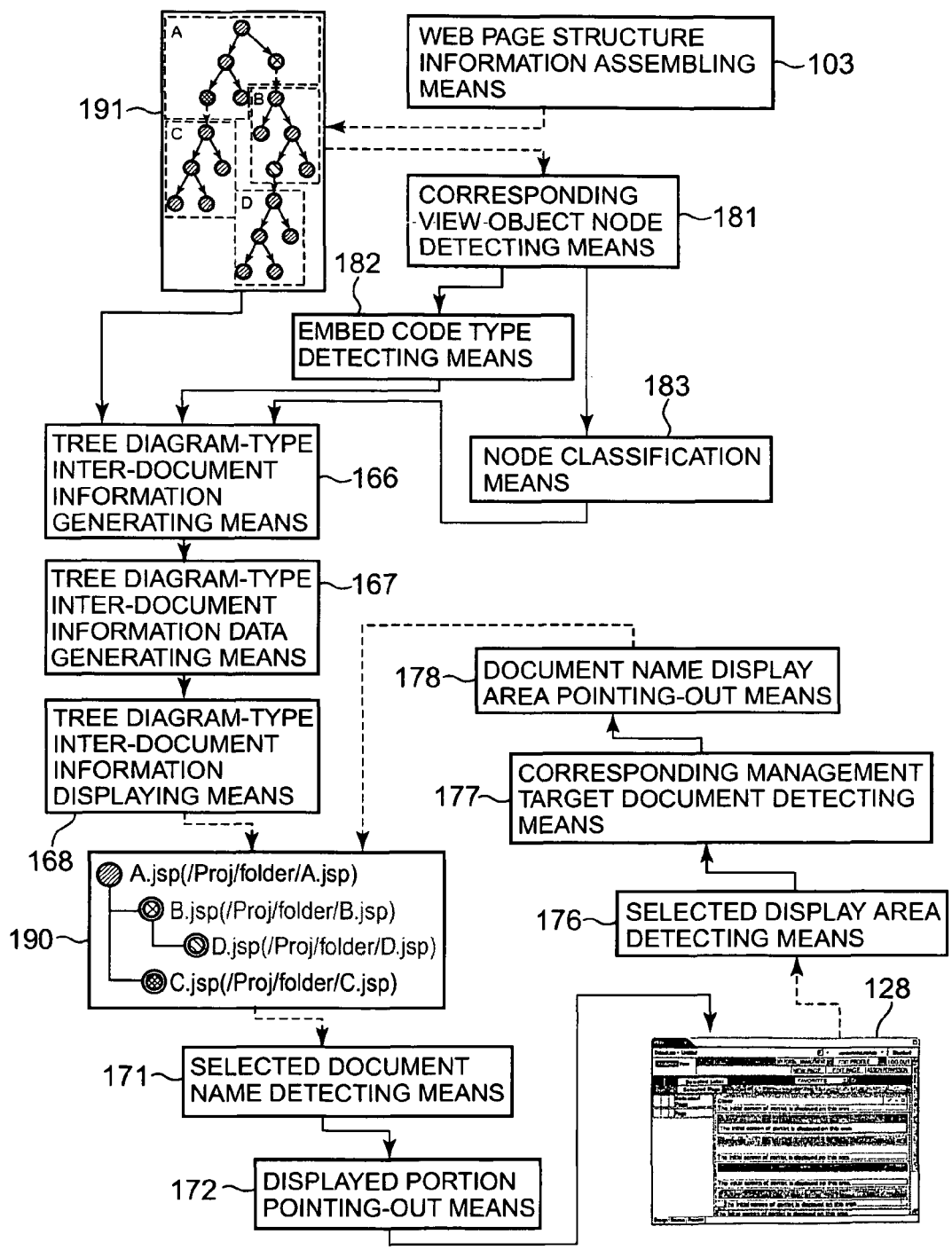
FIG. 6 is a functional block diagram of the main part of the second Web page authoring apparatus with additional functions.

FIG. 6 is a functional block diagram of the main part of the Web page authoring apparatus 165, showing additional functions. Selected document name detecting means 171 detects, as a selected document name, the name of a document selected by the author from the tree diagram-type inter-document information 190 being displayed. Displayed portion pointing-out means 172 points out a portion displayed in the browser-type edit screen 128 and corresponding to the selected document.

Figure 8:
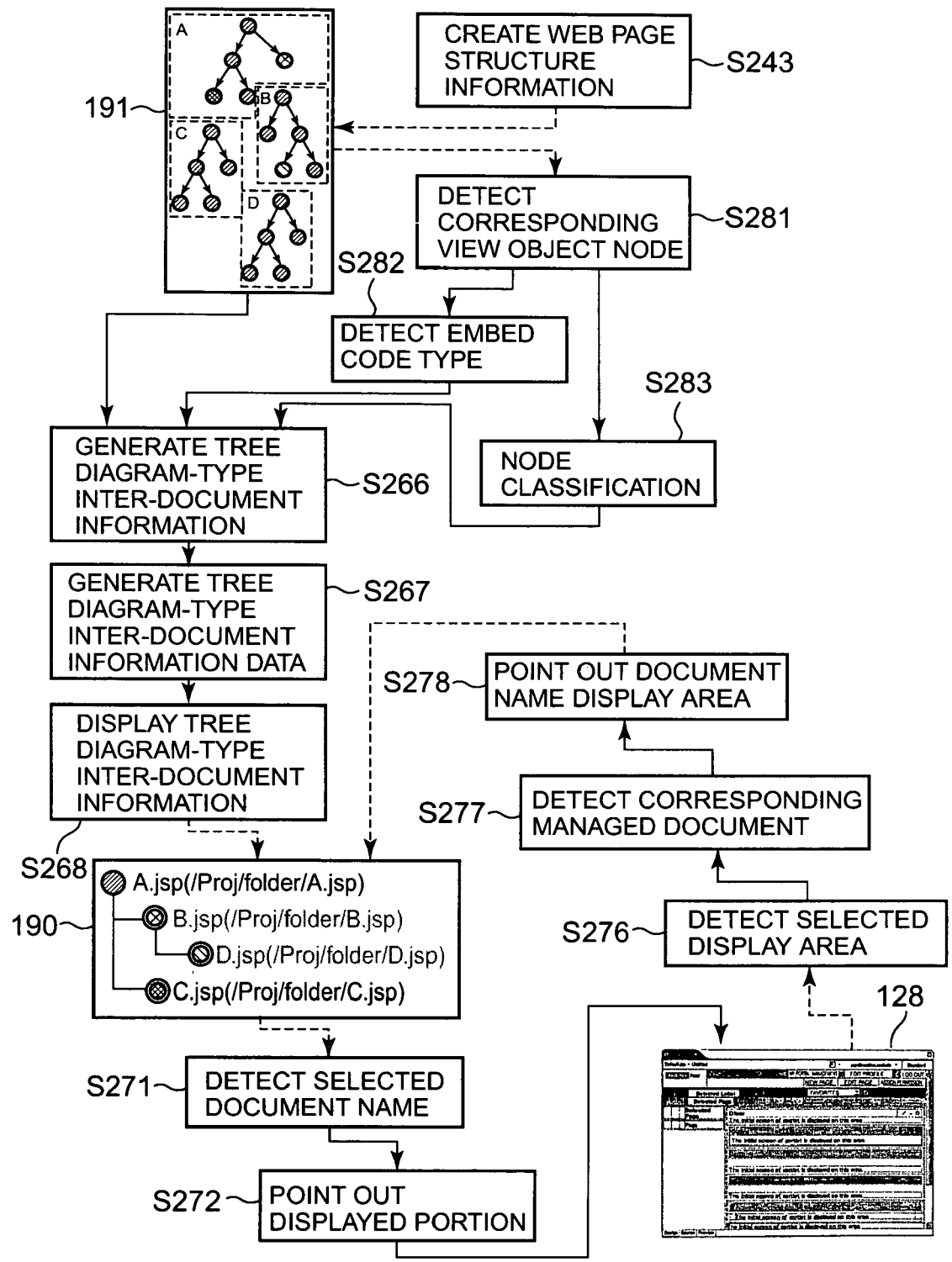
FIG. 8 is a flowchart of the main part of the second Web page authoring method with additional processing steps.

FIG. 8 is a flowchart of the main part of the Web page authoring method 140, showing additional processing steps. In selected document name detecting step S271, the name of a document selected by the author from the tree diagram-type inter-document information 190 being displayed is detected as a selected document name. In displayed portion pointing-out step S272, a portion displayed in the browser-type edit screen 128 and corresponding to the selected document is pointed out.

The document name selected by the embed-related code from the tree diagram-type inter-document information 190 corresponds to the one whose background color is inversed to indicate the focused state 655 in the window 654 of FIG. 14. In order to confirm the selected document name, the author brings the document name to be selected to the focused state 655 with a predetermined confirmation operation. In the window 654 of FIG. 14, the document name, Default.jsp, as the top managed document 125 is in the focused state 655. A display area of the managed document 125 the document name of which is selected from the tree diagram-type inter-document information 190 is pointed out, for example, with a frame border surrounding the display area on the browser-type edit screen 128. In the window 654, for example, if /po/PortalContent/skins/html/NoBorder/Control.jsp is selected, a frame border (not shown) surrounding such a portion (display area) to include "No Border" in the first line and "The initial screen . . . " in the third line may be displayed in the browser-type edit screen 650 of FIG. 13.

In FIG. 6, selected display area detecting means 176 detects the selected display portion in the browser-type edit screen 128 as a selected display area. The managed document 125 including a portion corresponding to the selected display area is called the corresponding managed document 125. Corresponding managed document detecting means 177 detects a corresponding managed document 125 based on the Web page structure information 127 (or, instead, a view object tree 191 to be described later as an example of the Web page structure information 127). Document name display area pointing-out means 178 points out such a portion to show the name of the corresponding managed document 125 in the tree diagram-type inter-document information 190.

In the Web page authoring method 265 of FIG. 8, a display portion selected by the author in the browser-type edit screen 128 is detected as a selected display area in selected display area detecting step S276. In corresponding managed document detecting step S277, a corresponding managed document 125 is detected based on the Web page structure information 127. In document name display area pointing-out step S278, such a portion to show the name of the corresponding managed document 125 in the tree diagram-type inter-document information 190 is pointed out.

The Web page authoring apparatus 165 and the Web page authoring method 265 allow the author to switch the foreground window alternately between the browser-type edit screen 128 and the tree diagram-type inter-document information 190, or to display both the browser-type edit screen 128 and the tree diagram-type inter-document information 190 at the same time in different display areas on the display screen. After changing the position of a cursor in the browser-type edit screen 128 with a predetermined operation or moving a mouse pointer to a certain position in the browser-type edit screen 128, the author double-clicks on the position, so that the name of a managed document 125 including the cursor position is pointed out on the screen of the tree diagram-type inter-document information 190, for example, with a highlight bar, a change in background color, or the like.

Objects appearing in the browser-type edit screen related to a Web page to be edited are called view objects. In the Web page authoring apparatus 165 of FIG. 5, the Web page structure information assembling means 103 assembles the Web page structure information 127 as a view object tree 191 showing a tree structure of view objects for the Web page to be edited. The tree diagram-type inter-document information generating means 166 scans each view object node in the view object tree 191 in such a manner that each parent view object node will come before its child view object node to determine whether each view object node in the view object tree 191 corresponds to the root node of the managed document 125. If the determination result is YES, the node is added, as a document node related to the managed document 125, to the tree diagram of the tree diagram-type inter-document information 190 in association with a corresponding parent document node, thereby completing the tree diagram of the tree diagram-type inter-document information 190.

In the Web page authoring method 265 of FIG. 8, Web page structure information is assembled in Web page structure information assembling step S243 as the view object tree 191 showing a view object tree structure for the Web page to be edited. In tree diagram generating step S266, each view object node in the view object tree is scanned in such a manner that each parent view object node will come before its child view object node to determine whether each view object node in the view object tree 191 corresponds to the root node of the managed document 125. If the determination result is YES, the node is added, as a document node related to the managed document 125, to the tree diagram of the tree diagram-type inter-document information 190 in association with a corresponding parent document node, thereby completing the tree diagram of the tree diagram-type inter-document information 190.

Figure 15:
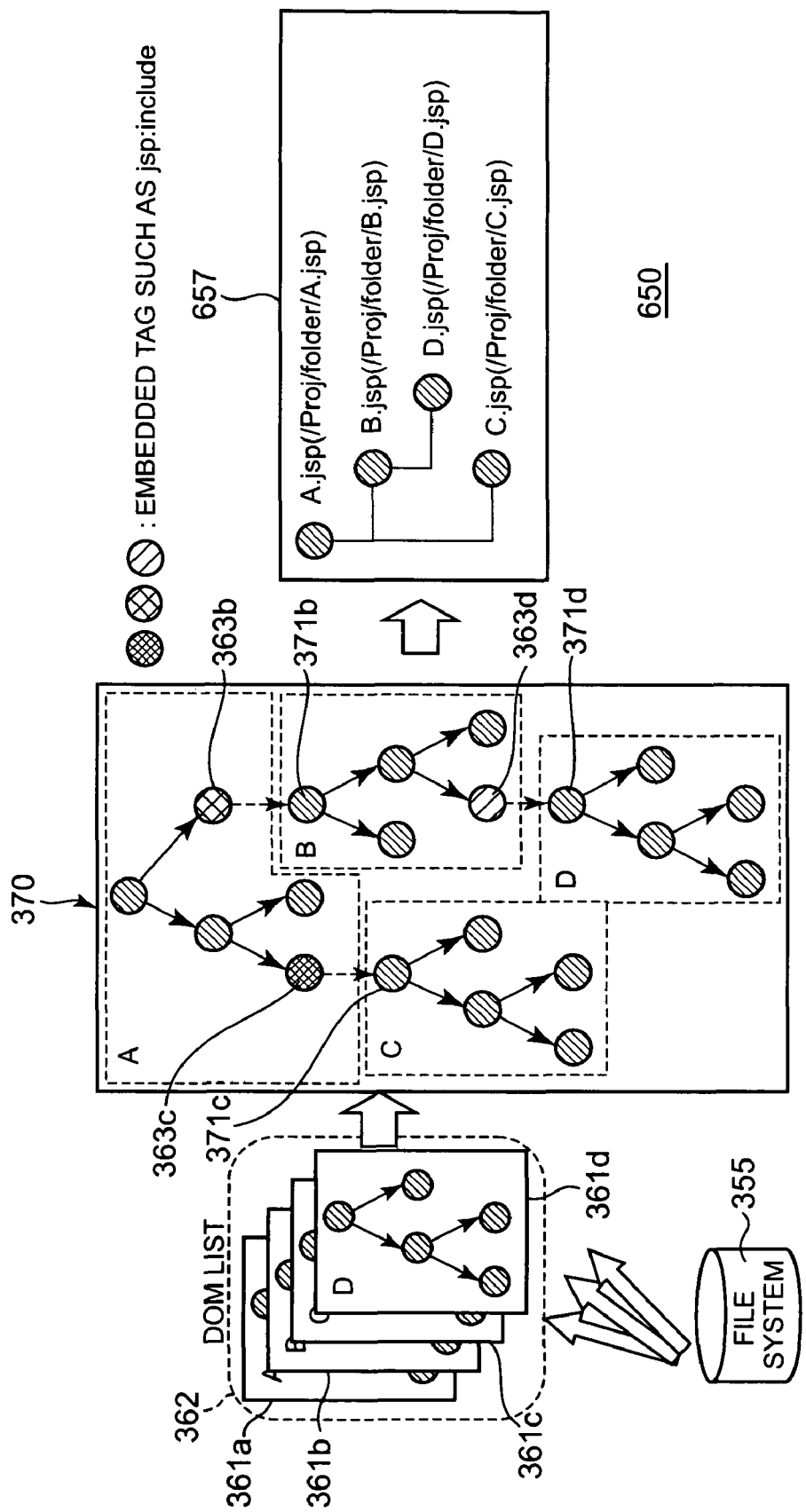
FIG. 15 is an illustration of how the Web page authoring tool creates the tree diagram-type inter-document information.

FIG. 15 is an illustration of how the Web page authoring tool 650 creates tree diagram-type inter-document information 657. The tree diagram-type inter-document information 657 is an example of the tree diagram-type inter-document information 190 in the Web page authoring apparatus 165 and the Web page authoring method 265. The Web page authoring tool 650 follows the same procedure as the creation of the view object tree 370 by the Web page authoring tool 338 (see FIG. 12) until it creates the view object tree 370. Each node of the tree diagram-type inter-document information 657 includes a round-shaped icon, a document name, and a set of absolute paths. After the completion of the creation of the view object tree 370, the view object nodes in the view object tree 370 are scanned to add nodes corresponding to DOM information 361*a*, 361*b*, 361*c*, and 361*d*, respectively, thereby completing the tree diagram-type inter-document information 657. In other words, the view object nodes are selected from the view object tree 370 in order from the top view object node. Then, when the selected view object node corresponds to the DOM information 361*a*, 361*b*, 361*c*, or 361*d*, a new node is added to the tree diagram-type inter-document information 657 as the node corresponding to the DOM information 361*a*, 361*b*, 361*c*, or 361*d*. The new node is added to the tree diagram-type inter-document information 657 in such a manner that the new node is connected to a parent node in the tree diagram of the tree diagram-type inter-document information 190 based on the parent-child relationship.

In the Web page authoring apparatus 165 of FIG. 6, corresponding view object node detecting means 181 scans the tree diagram of the tree diagram-type inter-document information 190 to detect, as a corresponding view object node, a node in the view object tree 191 corresponding to each tree diagram-type inter-document information node in the tree diagram. Embed-related code type detecting means 182 detects, as an embed-related code type, the type of embed-related code in a parent view object node of each corresponding view object node in the view object tree 191. The tree diagram-type inter-document information generating means 166 generates the tree diagram-type inter-document information 190 that allows the author to visually recognize the type of embed-related code related to a tree diagram-type inter-document information node in the tree diagram.

In the Web page authoring method 265 of FIG. 8, the tree diagram of the tree diagram-type inter-document information 190 is scanned in corresponding view object node detecting step S281 to detect, as a corresponding view object node, a node in the view object tree corresponding to each tree diagram-type inter-document information node in the tree diagram. In embed-related code type detecting step S282, the type of embed-related code in a parent view object node of each corresponding view object node in the view object tree is detected as an embed-related code type. In tree diagram generating step S266, the tree diagram-type inter-document information 190 that allows the author to visually recognize the type of embed-related code related to a tree diagram-type inter-document information node in the tree diagram is generated.

Figure 16:
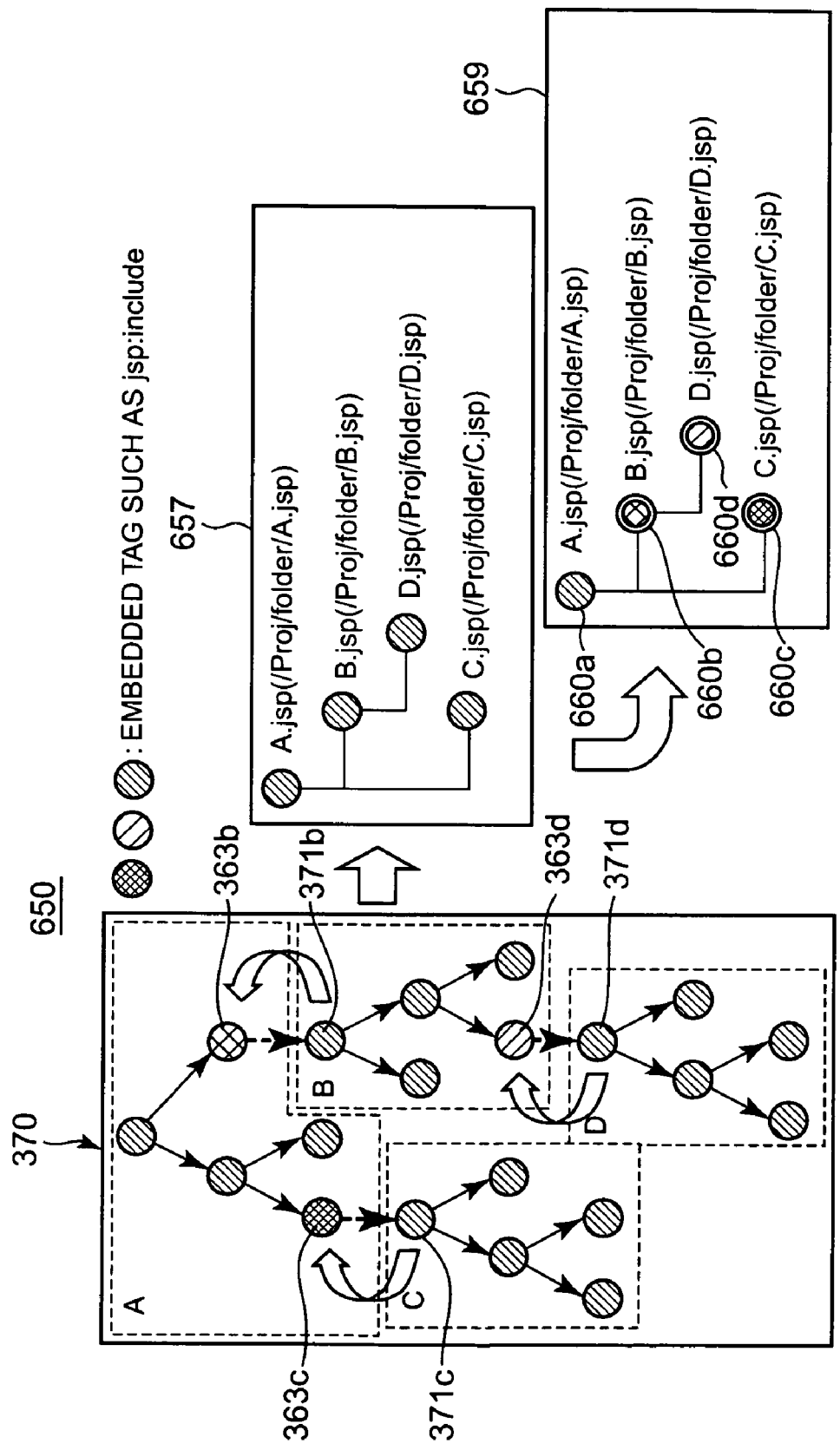
FIG. 16 is an illustration of how to create tree diagram-type inter-document information with inclusion type information.

FIG. 16 is an illustration of how to create tree diagram-type inter-document information 659 with embed type information. The tree diagram-type inter-document information 659 with embed type information is an example of the tree diagram-type inter-document information 190 that allows the author to visually recognize the type of embed-related code related to a tree diagram-type inter-document information node in the tree diagram in the Web page authoring apparatus 165 and the Web page authoring method 265. The view object tree 370 is an example of the view object tree 191. After completion of the tree diagram-type inter-document information 657, the tree diagram-type inter-document information 659 with embed type information is created by scanning the view object nodes in the view object tree 370. In other words, unselected view object nodes are selected as selected view object nodes one by one from the view object tree 370 to check whether each selected view object node corresponds to the root node of the DOM information 361a, 361b, 361c, or 361d. If the selected view object node corresponds to the root node of the DOM information 361a, 361b, 361c, or 361d, the type of the selected parent view object node, that is, the type of the include node 363b, 363c, or 363d is detected as an embed-related code type. Then, an icon 660a, 660b, 660c or 660d for the node of the tree diagram-type inter-document information 657 corresponding to the selected view object node is corrected to match the embed-related code type. The tree diagram-type inter-document information 657 to which all corrections were made becomes the tree diagram-type inter-document information 659 with embed type information.

In the Web page authoring apparatus 165 of FIG. 6, the corresponding view object node detecting means 181 scans the tree diagram of the tree diagram-type inter-document information 190 to detect, as a corresponding view object node, a node in the view object tree 191 corresponding to each tree diagram-type inter-document information node in the tree diagram. Node classification means 183 checks ancestor view object nodes of each corresponding view object node other than those related to embed-related code in the view object tree 191 to classify the tree diagram-type inter-document information nodes related to the corresponding view object node into nodes to be edited and those not to be edited based on the presence of an ancestor view object node indicating non-display. The tree diagram-type inter-document information generating means 166 generates the tree diagram-type inter-document information 190 that allows the author to visually recognize the abovementioned classification of the tree diagram-type inter-document information in the tree diagram.

In the Web page authoring method 265 of FIG. 8, the tree diagram of the tree diagram-type inter-document information 190 is scanned in corresponding view object node detecting step S281 to detect, as a corresponding view object node, a node in the view object tree 191 corresponding to each tree diagram-type inter-document information node in the tree diagram. In node classification step S283, ancestor view object nodes of each corresponding view object node other than those related to embed-related code in the view object tree 191 are checked to classify the tree diagram-type inter-document information nodes related to the corresponding view object node into nodes to be edited and those not to be edited based on the presence of an ancestor view object node indicating non-display. In tree diagram generating step S266, the tree diagram-type inter-document information 190 that allows the author to visually recognize abovementioned classification of the tree diagram-type inter-document information nodes in the tree diagram is generated.

Figure 17:
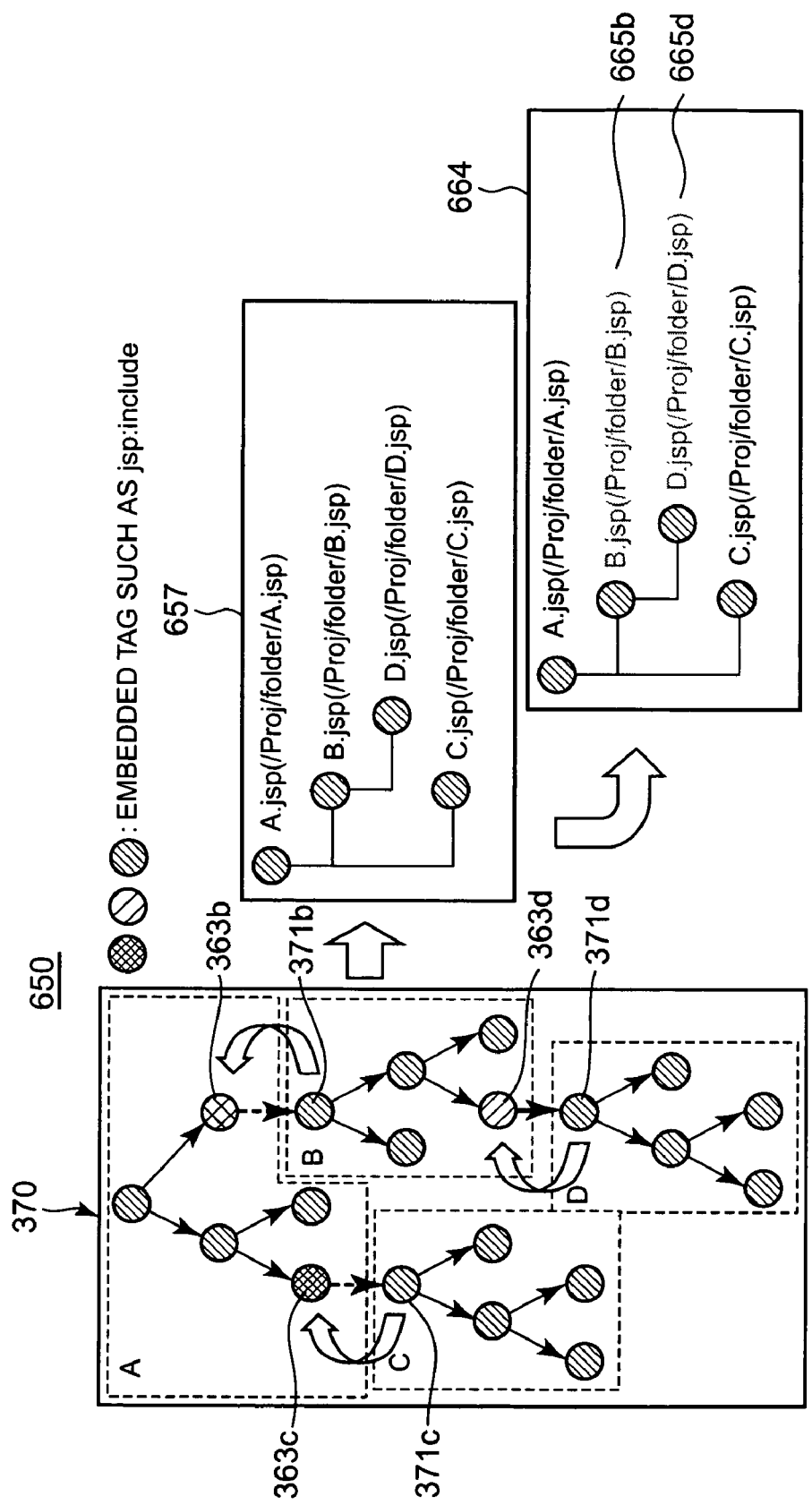
FIG. 17 is an illustration of how to create tree diagram-type inter-document information with editability classification.

FIG. 17 is an illustration of how to create tree diagram-type inter-document information 664 with editability classification. The tree diagram-type inter-document information 664 with editability target classification is an example of the tree diagram-type inter-document information 190 that allows the author to visually recognize editability classification of tree diagram-type inter-document information nodes of the tree diagram in the Web page authoring apparatus 165 and the Web page authoring method 265. After completion of the tree diagram-type inter-document information 657, the tree diagram-type inter-document information 664 with editability classification is created by scanning the view object nodes in the view object tree 370. In other words, unselected view object nodes are selected as selected view object nodes one by one from the view object tree 370 to check whether each selected view object node corresponds to the root node of the DOM information 361a, 361b, 361c, or 361d. If the selected view object node corresponds to the root node of the DOM information 361a, 361b, 361c, or 361d, ancestor view object nodes (other than the nodes related to embed-related code) of the selected view object node are searched for in order from the lowest to the highest up to the root node of the view object tree 370 in the worst case. Then, searching is completed upon reaching an ancestor view object node indicating non-display to correct the node of the tree diagram-type inter-document information 657 corresponding to the selected view object node to the display state of a document not to be edited. The display state of a document not to be edited means, for example, that the corresponding node is changed from normal-density color to light color like nodes 665b and 665d. The light-colored display of the nodes 665b and 665d makes it difficult to read the node icons or the document names. The tree diagram-type inter-document information 657 to which all corrections were made becomes the tree diagram-type inter-document information 664 with editability classification.

Figure 18:
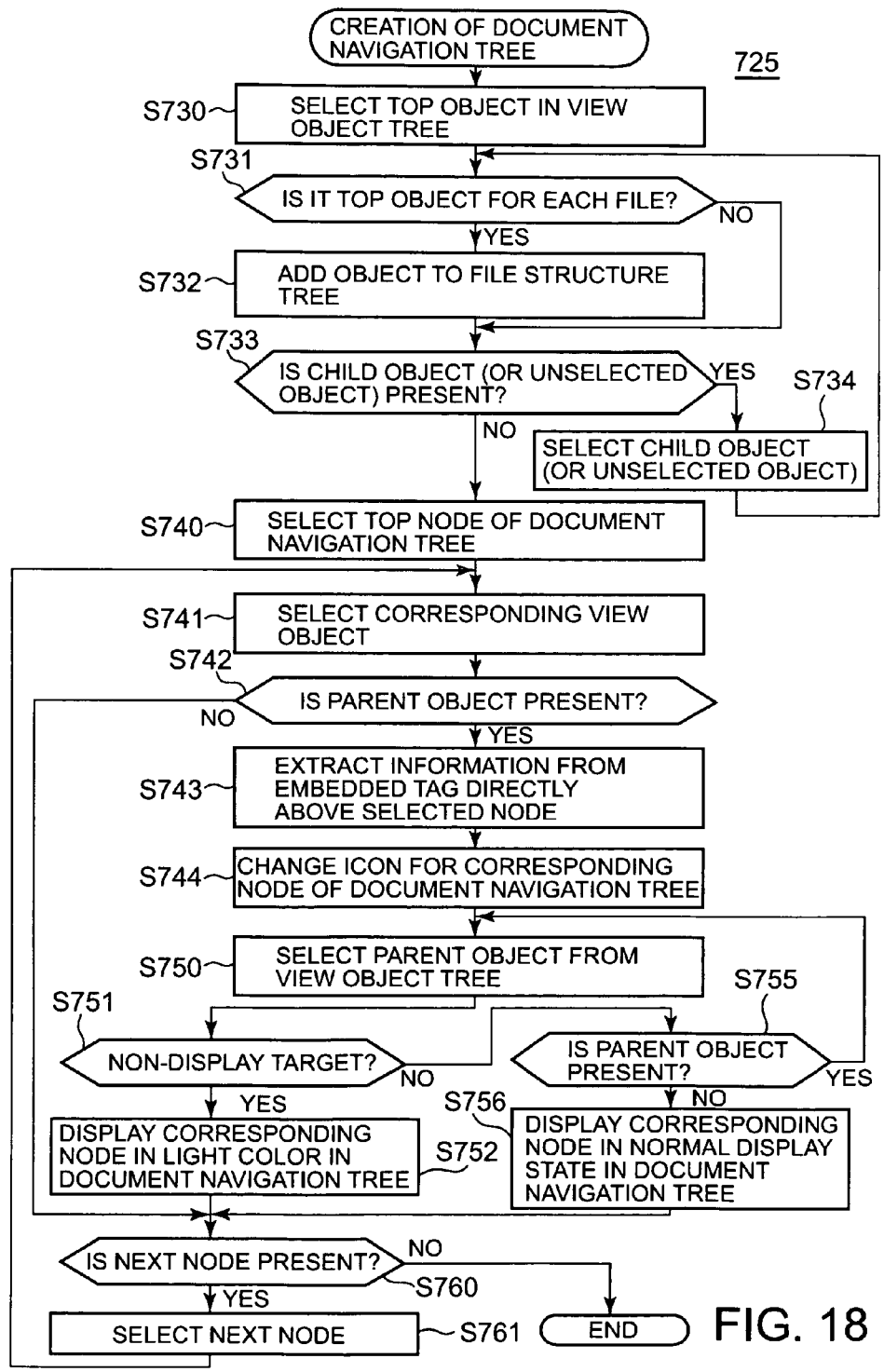
FIG. 18 is a flowchart of a document navigation tree creating method.

FIG. 18 is a flowchart of a document navigation tree creating method 725. The document navigation tree creating method 725 is such that the tree diagram-type inter-document information 657 (FIG. 15) is created in steps S730 to S734, the tree diagram-type inter-document information 659 with embed type information (FIG. 16) is created in steps S740 to S744, the tree diagram-type inter-document information 664 with editability classification (FIG. 17) is created in steps S750 to S756, and finally tree diagram-type inter-document information is created by integrating the tree diagram-type inter-document information 659 with embed type information and the tree diagram-type inter-document information 664 with editability classification. The tree diagram-type inter-document information 657, the tree diagram-type inter-document information 659 with embed type information, and the tree diagram-type inter-document information 664 with editability classification may be called "document navigation trees" accordingly.

In step S730, the top view object node of the view object tree 370 is selected as a selected view object node. In step S730 and step S734 to be described later, a predetermined view object node is selected from unselected view object nodes. In this case, the order of selection of view object nodes is so determined that a parent view object node will always have to be selected before its child view object node. The reason for this is that, when a node is added to the tree diagram-type inter-document information 657 in step 732, the addition of a child node can never come before the addition of a parent node because the child node has to be added by being connected to the parent node.

In step S731, it is determined whether the selected view object node corresponds to the root object of the DOM information 361*a*, 361*b*, 361*c*, or 361*d*. If the determination result in step S731 is YES, the procedure goes to step S732, while if the determination result is NO, the procedure goes to step S733. In step S732, a node corresponding to the selected view object node is added to the tree diagram-type inter-document information 657. On this occasion, if a parent node of the added node is present, the node is added to the tree diagram-type inter-document information 657 as a child node connected to the parent node. In step S733, it is determined whether any child view object node of the view object node currently selected is present. If no child view object node is present, it is determined in step S733 whether any view object node remains unselected in the view object tree 370, rather than whether any child view object node is present. If the determination result in step S733 is NO, the document navigation tree (corresponding to the tree diagram-type inter-document information 657) is regarded as being completed, and the procedure goes to step S740. If the determination result in step S733 is YES, the procedure goes to step S734 to update the selected view object node as the child view object node or unselected view object node. After that, the procedure returns to step S731.

In step S740, the root node of the document navigation tree is selected. The node selected in step S740 and step S761 to be described later may be any node as long as it is unselected in the document navigation tree. In step S741, a view object node in the view object tree 370 corresponding to the selected node in the document navigation tree (corresponding to the tree diagram-type inter-document information 657) is selected as a selected view object node. In step S742, it is determined whether a parent view object node of the selected view object node is present in the view object tree 370. In the view object tree 370, if the selected view object node is a view object node for a child document, a parent view object node of the selected view object node is present. In this case, the parent view object node is related to embed-related code to embed the selected view object node in the parent document.

In step S743, the type of the embed-related code is extracted from an embedded tag immediately above the selected view object node, that is, from a tag related to the parent view object node. Since any object related to embed-related code is not shown on a browser screen or edit display, it is not a view object in a strict sense. Therefore, as described in FIG. 12, embed-related nodes 363*b*, 363*c*, and 363*d* may be combined with the root nodes 371*b*, 371*c*, and 371*d*, respectively. In such a case, since the selected view object node and the view object node related to the embed-related code coincide with each other. Since the view object node related to the embed-related code will not be the parent view object node of the selected view object node, link information 364*b*, 364*c*, and 364*d* in the DOM list 362 of FIG. 12 (where there is no link information 364*d* because there is no DOM information 361*d* in FIG. 12) is tracked back to the embed-related nodes 363*b*, 363*c*, and 363*d* to detect the type of each embed-related node 363*b*, 363*c*, or 363*d* instead of the type of the embed-related code for the parent view object node. In step S744, an icon for the selected node in the document navigation tree is changed according to the type of the embed-related code.

When the procedure goes from step S744 to step S750, a parent view object node of the corresponding view object node is set in step S750 as a selected parent view object node.

When the procedure returns from step S755 to step S750, the currently selected parent view object node is changed in step S750 to a selected parent view object node determined to be present in step S755. If the selected parent view object node is a view object node related to embed-related code, the view object node is skipped to set a parent view object node of the skipped view object node as a selected parent view object node. In step S751, it is determined whether the selected parent view object node is of non-displayed attribute (that is, an object indicating non-display). If the determination result is YES, the procedure goes to step S752, while if it is NO, the procedure goes to step S755. In step S755, it is determined whether a further parent view object node of the selected parent view object node is present in the view object tree 370. If the determination result is YES, the procedure returns to step S750, while if it is NO, the procedure goes to step S756.

In step S752, the corresponding node is brought to the light-colored display state in the document navigation tree (corresponding to the tree diagram-type inter-document information 657) to indicate that the managed document related to the corresponding node is a document not to be edited. In step S756, the corresponding node is brought to the normal display state to indicate that the managed document related to the corresponding node is a document to be edited.

In step S760, it is determined whether any node remains unselected in the document navigation tree. If the determination result is YES, the procedure goes to step S761 to select an unselected node as a selected node. Then the procedure returns to step S741. If the determination result is NO, the document navigation tree creating method 725 is ended.

The Web page authoring tool 650 creates the tree diagram-type inter-document information 659 with embed type information and the tree diagram-type inter-document information 664 with editability classification based on the view object tree 370. There may be a case where one child document is included at one parent document in two or more embedding positions, rather than at one embedding position. In such a case, the child document may be a document to be edited and of a first embed type in one embedding position whereas it may be a document not to be edited and of a second embed type at the other embedding position. Such a determination can be made without difficulty based on information on the view object tree 370.

Figure 19:
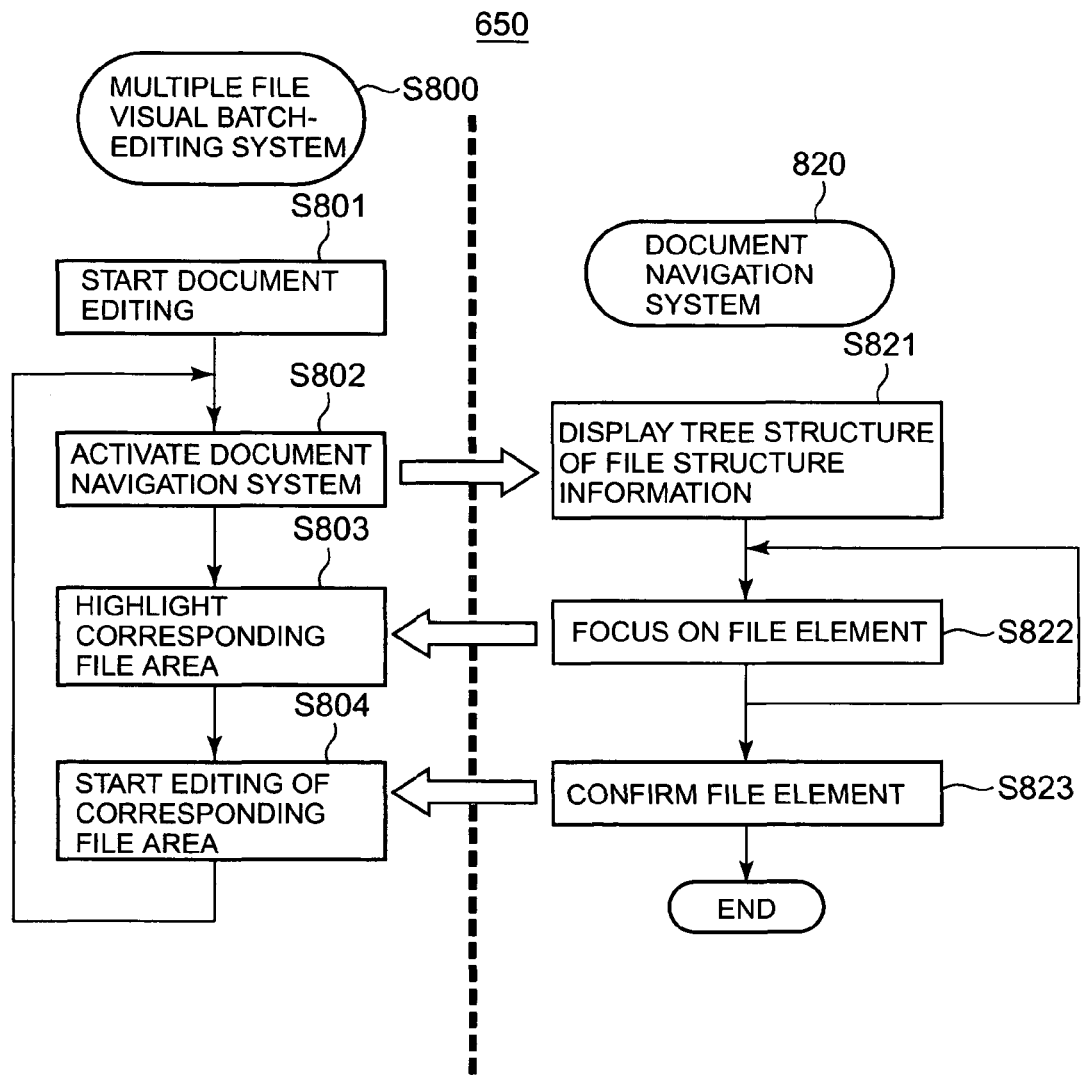
FIG. 19 is a flowchart for explaining the operation of a multiple file visual batch-editing system and a document navigation system, both provided by the Web page authoring tool.

FIG. 19 is a flowchart for explaining the operation of a multiple file visual batch-editing system 800 and a document navigation system 820, both provided in the Web page authoring tool 650. In step S801, the author starts editing of Web page documents. The author edits the plural pieces of DOM information 361*a*, 361*b*, 361*c*, and 361*d* connected in a direct parent-child relationship or in a chain of parent-child relationships collectively on the browser-type edit screen 651. The author cannot understand what kinds of documents are included on the browser-type edit screen 651. Therefore, if the author wants to know them, the author activates the document navigation system 820 in step S802.

Following the execution of step S802, the document navigation system 820 is activated to display the document navigation tree (tree diagram-type inter-document information 657, tree diagram-type inter-document information 659 with embed type information, or tree diagram-type inter-document information 664 with editability classification) in step S821. In step S822, the author places focus on a file element (document name) in the document navigation tree. In response to this operation, a display area of the browser-type edit screen 651 (FIG. 13) corresponding to the file element in the focused state in the document navigation tree is highlighted. The author can move focus in the document navigation tree to change highlighted areas on the browser-type edit screen 651 in synchronization of the focus movement.

In step S823, the author confirms the selection of the file element with a predetermined user operation. In response to this operation, the editing portion is moved, for example, to the top portion within the display area of the browser-type edit screen 651 relevant to the confirmed file element so that the author will start editing of the file element at the editing portion on the browser-type edit screen 651.

After the execution of step S823, the document navigation system 820 is deactivated. The author continues to edit the document and, if the author wants to know again what kinds of documents are included in the browser-type edit screen 651, the author performs step S802.

In the explanatory flowchart of FIG. 19, the file element is specified in the document navigation system 820 to point out its display area on the browser-type edit screen 651. However, a certain display area may be specified on the browser-type edit screen 651 to point out a relevant file element in the document navigation system 820. In such a case, the sequence of operations from focus in S822 to highlight in step S803 is changed from focus in step S803 to highlight in step S822.

Figure 20:
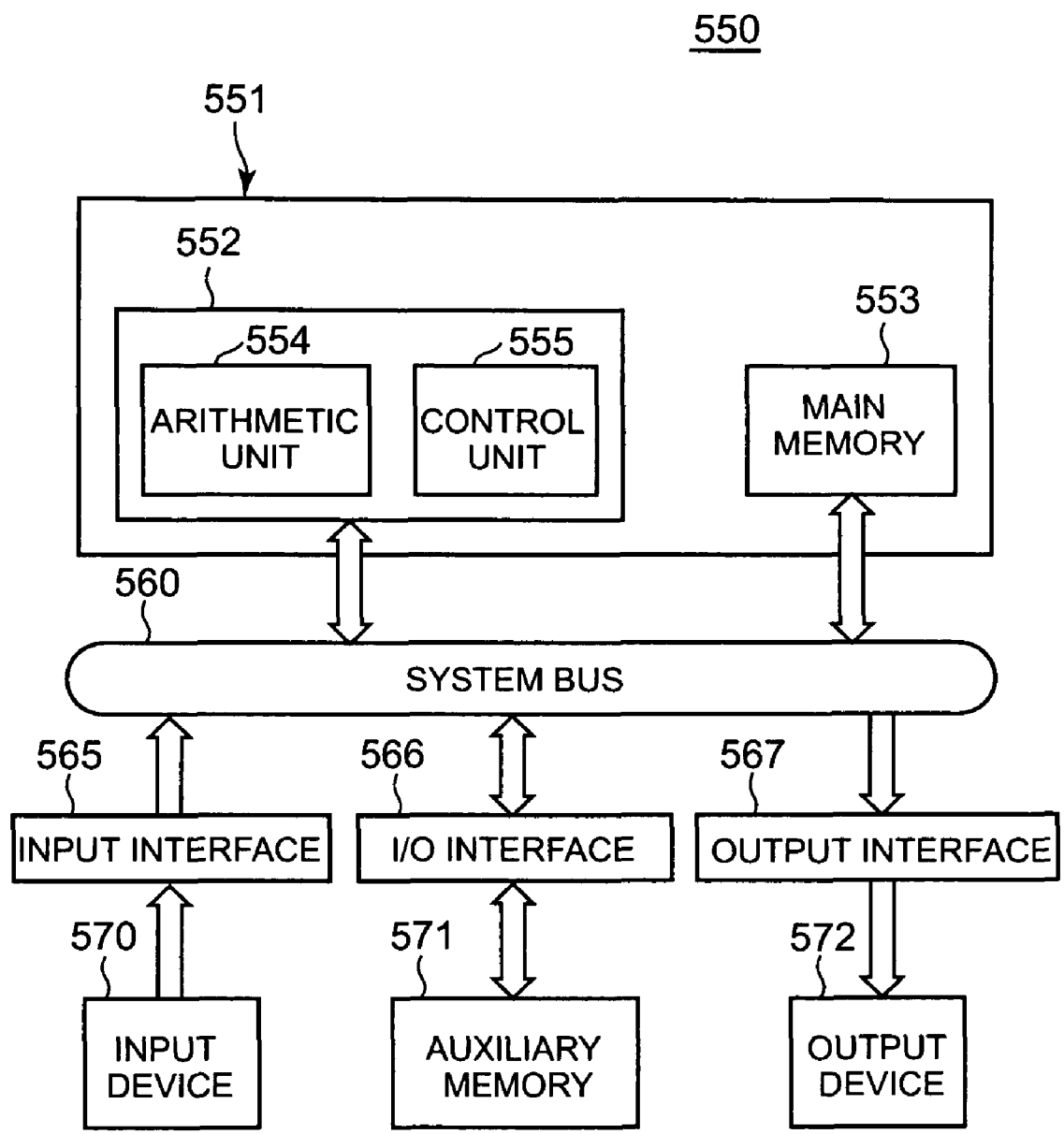
FIG. 20 is a schematic block diagram of a computer on which a program of the present invention is implemented.

FIG. 20 is a schematic block diagram of a computer 550 on which a program of the present invention is implemented. A Web page authoring program of the present invention causes the computer 550 to function as the respective means of the Web page authoring apparatus 100 and the Web page authoring apparatus 165. Alternatively, a Web page authoring program of the present invention causes the computer 550 to execute the respective processing steps of the Web page authoring method 140 and the Web page authoring method 265.

The present invention can be implemented in hardware, software, or a combination thereof. As a typical example of a combination of hardware and software, the present invention is implemented in a computer system with a predetermined program. In this case, the predetermined program is loaded and executed in the computer system to control the computer system to execute the processing operations according to the present invention. This program consists of a set of instructions that can be represented in any language, code, and notation. The set of instructions allows the computer system to execute specific functions directly or after either or both of (a) transformation into another language, code, or notation, and (b) duplication onto another medium. In addition to the program itself, a medium recording the program and a program product are also included within the scope of the present invention. The program executing the functions of the present invention can be stored on any computer-readable medium, such as a flexible disk, MO, CD-ROM, DVD, hard disk, ROM, MRAM, or RAM. The program of the present invention can also be stored on a recording medium by downloading it from another computer system connected through a communication line, or duplicating it from another recording medium. Further, the program of the present invention can be stored on one or more recording media by compressing or dividing it into two or more program components.

As shown in FIG. 20, a computer main body 551 includes a CPU 552 and a main memory 553. The CPU 552 includes an arithmetic unit 554 and a control unit 555. The arithmetic unit 554 performs calculations, comparison, determination, etc., while the control unit 555 controls the main memory 553, the arithmetic unit 554, etc. A system bus 560 consists of a data bus, an address bus, and a control bus to connect the CPU 552, the main memory 553, an input interface 565, an I/O interface 566, and an output interface 567. An input device 570 includes, for example, a keyboard, a read-only CD drive, etc. to send data to the system bus 560 through the input interface 565. An auxiliary memory 571 is, for example, an HDD (hard disk drive) or a CD-R/W drive to exchange data with the system bus 560 through the I/O interface 566. An output device 572 includes, for example, a display and a printer to receive data from the system bus 560 through the output interface 567. The program of the present invention is stored, for example, in the auxiliary memory 571 such as an HDD, and read into the main memory 553 to execute the functions.

What is claimed is:

1. A computer implemented Web page authoring method, comprising:

individually managing the contents of documents forming the respective portions of a Web page to be edited, as managed documents;

deriving from the contents of each managed document structure information of each managed document including an embed-related code for embedding another document at a predetermined embedding position, as structure information by document;

assembling structure information of the Web page to be edited by combining the structure information by document based on the embed-related code in each structure information by document, as Web page structure information;

generating edit screen data to create an edit screen on which the tag contents of a document to be edited are converted to visual representation, based on the contents of the managed documents and the Web page structure information;

generating an edit screen based on the edit screen data;

detecting a managed document including a portion corresponding to an edited portion on the edit screen, as relevant managed document;

synchronizing the contents of the relevant managed document with the edited contents on the edit screen based on edit operations on the edit screen;

generating inter-document information represented by a tree diagram including all parent-child relationships by searching a child document of each managed document based on the embed-related code of that managed document and collecting parent-child relationship information among the managed documents relating to the Web page to be edited, the parent-child relationship being a relationship between a parent document and a child document, the parent document being a document into which another document is embedded by an embed-related code described in the parent document, the child document being the another document;

generating inter-document information data for displaying the inter-document information; and displaying the inter-document information based on the inter-document information data;

wherein the edit screen data generating step matches the edit screen data with the edited contents on the edit screen based on the edit operations on the edit screen.

2. The method according to claim 1, further comprising:

detecting, as a selected document name, the name of a document selected by an author from the inter-document information being displayed, and pointing out a portion displayed in the edit screen and corresponding to the selected document.

3. The method according to claim 1, further comprising:

detecting, as a selected display area, a display portion selected by an author in the edit screen;

detecting a corresponding managed based on the Web page structure information, the corresponding managed document being a managed document including a portion corresponding to the selected display area; and pointing out a portion showing the name of the corresponding managed document in the inter-document information.

4. The method according to claim 1, wherein:

the Web page structure information is assembled in the Web page structure information assembly as a view object tree showing a tree structure of view objects for the Web page to be edited, the view object being an object appearing in the edit screen related to the Web page to be edited, and in inter-document information generating, each view object node in the view object tree is scanned in such a manner that each parent view object node will come before its child view object node to determine whether each view object node in the view object tree corresponds to the root node of the managed document, and if the determination result is affirmative, adds the node, as a document node related to the managed document, to a tree diagram of the inter-document information in association with a corresponding parent document node, thereby completing the inter-document information.

5. The method according to claim 4, further comprising:

scanning the tree diagram of the inter-document information to detect, for each inter-document information node as the node in tree diagram; a node in the view object tree corresponding to the inter-document information, as a corresponding view object node; and detecting, as an embed-related type, the type of embed-related code in a parent view object node of each corresponding view object node in the view object tree, wherein, in inter-document information generation, the inter-document information is generated so that the author can visually recognize the type of embed-related code for the inter-document information node in the tree diagram.

6. The method according to claim 4, further comprising:

scanning the tree diagram of the inter-document information to detect, for each inter-document information node as the node in the tree diagram; a node in the view object tree corresponding to the inter-document information, as a corresponding view object node; and checking ancestor view object nodes of each corresponding view object node other than those related to embed-related code in the view object tree to classify the inter-document information nodes related to the corresponding view object node into nodes to be edited and not to be edited based on the presence of an ancestor view object node indicating non-display;

wherein, in inter-document information generation, the inter-document information is generated so that the author can visually recognize the classification of the inter-document information nodes to be edited and not to be edited in the tree diagram.

7. The method according to claim 6, wherein the edit screen is a browser-type edit screen.

8. A program product comprising a computer readable recording medium and a program recorded on the recording medium to cause a computer to execute each step of a Web page authoring method, the Web page authoring method comprising:

individually managing the contents of documents forming the respective portions of a Web page to be edited, as managed documents;

deriving from the contents of each managed document structure information of each managed document including an embed-related code for embedding another document at a predetermined embedding position, as structure information by document;

assembling structure information of the Web page to be edited by combining the structure information by document based on the embed-related code in each structure information by document, as Web page structure information;

generating edit screen data to create an edit screen on which the tag contents of a document to be edited are converted to visual representation, based on the contents of the managed documents and the Web page structure information;

generating an edit screen based on the edit screen data;

detecting a managed document including a portion corresponding to an edited portion on the edit screen, as relevant managed document;

synchronizing the contents of the relevant managed document with the edited contents on the edit screen based on edit operations on the edit screen;

generating inter-document information represented by a tree diagram including all parent-child relationships by searching a child document of each managed document based on the embed-related code of that managed document and collecting parent-child relationship information among the managed documents relating to the Web page to be edited, the parent-child relationship being a relationship between a parent document and a child document, the parent document being a document into which another document is embedded by an embed-related code described in the parent document, the child document being the another document;

generating inter-document information data for displaying the inter-document information; and displaying the inter-document information based on the inter-document information data;

wherein the edit screen data generating step matches the edit screen data with the edited contents on the edit screen based on the edit operations on the edit screen.

* * * * *